(12) United States Patent
Ishii

(10) Patent No.: US 8,144,944 B2
(45) Date of Patent: Mar. 27, 2012

(54) IMAGE SHARING SYSTEM AND METHOD

(75) Inventor: Kensuke Ishii, San Diego, CA (US)

(73) Assignee: Olympus Corporation, Hachioji-Shi, Tokyo (JP)

( * ) Notice: Subject to any disclaimer, the term of this patent is extended or adjusted under 35 U.S.C. 154(b) by 949 days.

(21) Appl. No.: 11/838,733

(22) Filed: Aug. 14, 2007

(65) Prior Publication Data

US 2009/0046954 A1    Feb. 19, 2009

(51) Int. Cl.
    *G06K 9/62*    (2006.01)
(52) U.S. Cl. ....................................................... 382/118
(58) Field of Classification Search .................... None
     See application file for complete search history.

(56) References Cited

U.S. PATENT DOCUMENTS

| | | |
|---|---|---|
| 6,289,382 B1 | 9/2001 | Bowman-Amuah |
| 6,332,163 B1 | 12/2001 | Bowman-Amuah |
| 6,339,832 B1 | 1/2002 | Bowman-Amuah |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,442,748 B1 | 8/2002 | Bowman-Amuah |
| 6,477,580 B1 | 11/2002 | Bowman-Amuah |
| 6,477,665 B1 | 11/2002 | Bowman-Amuah |
| 6,496,850 B1 | 12/2002 | Bowman-Amuah |
| 6,502,213 B1 | 12/2002 | Bowman-Amuah |
| 6,526,158 B1 | 2/2003 | Goldberg |
| 6,529,909 B1 | 3/2003 | Bowman-Amuah |
| 6,529,948 B1 | 3/2003 | Bowman-Amuah |
| 6,539,396 B1 | 3/2003 | Bowman-Amuah |
| 6,549,949 B1 | 4/2003 | Bowman-Amuah |
| 6,550,057 B1 | 4/2003 | Bowman-Amuah |
| 6,571,282 B1 | 5/2003 | Bowman-Amuah |
| 6,578,068 B1 | 6/2003 | Bowman-Amuah |
| 6,601,192 B1 | 7/2003 | Bowman-Amuah |
| 6,601,234 B1 | 7/2003 | Bowman-Amuah |
| 6,606,660 B1 | 8/2003 | Bowman-Amuah |

(Continued)

FOREIGN PATENT DOCUMENTS

JP    2003032523    1/2003

(Continued)

OTHER PUBLICATIONS

Fujifilm Displays Face Recognition and Detection Ability; Available in new Electronic Photo Album http://www.digitalcamerainfo.com/content/Fujifilm-Displays-Face-Recognition -and Detection Ability-Available-in-new-Electronic-Photo-Book.htm, May 22, 2008.

(Continued)

*Primary Examiner* — Brian Werner
(74) *Attorney, Agent, or Firm* — Sheppard Mullin Richter & Hampton LLP

(57) ABSTRACT

An image capture device, includes a body; an image sensor in the body; a lens configured to focus a scene onto the image sensor; a communications interface in the body; an image processor coupled to receive an image from or to send an image to the communications interface; executable program code embodied in a computer readable medium and configured to cause the image processor to: process image data associated with a first facial area in a first image to determine a first data set of parameters associated with the first facial area; scan one or more subsequent images stored in memory accessible by the image processor; identify facial areas in the subsequent images and process image data associated with identified facial areas in the subsequent images to determine subsequent data sets of parameters associated with identified facial areas; and compare the first and subsequent data sets to determine whether the one or more subsequent images includes a same face as the face highlighted in the first image.

20 Claims, 15 Drawing Sheets

U.S. PATENT DOCUMENTS

| | | |
|---|---|---|
| 6,611,607 B1 | 8/2003 | Davis et al. |
| 6,615,199 B1 | 9/2003 | Bowman-Amuah |
| 6,615,253 B1 | 9/2003 | Bowman-Amuah |
| 6,636,242 B2 | 10/2003 | Bowman-Amuah |
| 6,640,238 B1 | 10/2003 | Bowman-Amuah |
| 6,640,244 B1 | 10/2003 | Bowman-Amuah |
| 6,640,249 B1 | 10/2003 | Bowman-Amuah |
| 6,715,145 B1 | 3/2004 | Bowman-Amuah |
| 6,742,015 B1 | 5/2004 | Bowman-Amuah |
| 6,819,783 B2 | 11/2004 | Goldberg et al. |
| 6,842,906 B1 | 1/2005 | Bowman-Amuah |
| 6,907,387 B1 | 6/2005 | Reardon |
| 6,959,122 B2 | 10/2005 | McIntyre |
| 6,970,183 B1 | 11/2005 | Monroe |
| 6,975,746 B2 | 12/2005 | Davis et al. |
| 6,995,789 B2 | 2/2006 | McIntyre et al. |
| 6,999,111 B2 | 2/2006 | McIntyre et al. |
| 7,003,139 B2 | 2/2006 | Endrikhovski et al. |
| 7,021,534 B1 | 4/2006 | Kiliccote |
| 7,062,073 B1 | 6/2006 | Tumey |
| 7,103,772 B2 | 9/2006 | Jørgensen et al. |
| 7,124,191 B2 | 10/2006 | McIntyre |
| 7,131,136 B2 | 10/2006 | Monroe |
| 7,164,117 B2 | 1/2007 | Breed et al. |
| 7,173,604 B2 | 2/2007 | Marvit |
| 7,175,528 B1 | 2/2007 | Cumbers |
| 7,176,886 B2 | 2/2007 | Marvit et al. |
| 7,176,887 B2 | 2/2007 | Marvit et al. |
| 7,176,888 B2 | 2/2007 | Marvit et al. |
| 7,180,500 B2 | 2/2007 | Marvit et al. |
| 7,180,501 B2 | 2/2007 | Marvit et al. |
| 7,180,502 B2 | 2/2007 | Marvit et al. |
| 7,194,114 B2 | 3/2007 | Schneiderman |
| 7,224,819 B2 | 5/2007 | Levy et al. |
| 7,243,153 B2 | 7/2007 | McIntyre |
| 7,243,945 B2 | 7/2007 | Breed et al. |
| 2002/0196342 A1 | 12/2002 | Walker et al. |
| 2002/0196344 A1 | 12/2002 | McIntyre et al. |
| 2002/0196986 A1 | 12/2002 | McIntyre |
| 2002/0198936 A1 | 12/2002 | McIntyre et al. |
| 2003/0007200 A1 | 1/2003 | McIntyre |
| 2003/0009527 A1 | 1/2003 | McIntyre |
| 2003/0009568 A1 | 1/2003 | McIntyre |
| 2003/0009569 A1 | 1/2003 | McIntyre |
| 2003/0058277 A1 | 3/2003 | Bowman-Amuah |
| 2003/0059124 A1 | 3/2003 | Center |
| 2003/0078968 A1 | 4/2003 | Needham et al. |
| 2003/0093430 A1 | 5/2003 | Mottur |
| 2003/0103645 A1 | 6/2003 | Levy et al. |
| 2003/0117651 A1 | 6/2003 | Matraszek et al. |
| 2003/0118216 A1 | 6/2003 | Goldberg |
| 2003/0122839 A1 | 7/2003 | Matraszek et al. |
| 2003/0128389 A1 | 7/2003 | Matraszek et al. |
| 2003/0149939 A1 | 8/2003 | Hubel et al. |
| 2003/0189589 A1 | 10/2003 | LeBlanc et al. |
| 2003/0227550 A1 | 12/2003 | Manico et al. |
| 2003/0228901 A1 | 12/2003 | Walker et al. |
| 2004/0008253 A1 | 1/2004 | Monroe |
| 2004/0008258 A1 | 1/2004 | Aas |
| 2004/0008872 A1 | 1/2004 | Goldberg |
| 2004/0022444 A1 | 2/2004 | Rhoads |
| 2004/0024694 A1 | 2/2004 | Lawrence et al. |
| 2004/0037449 A1 | 2/2004 | Davis et al. |
| 2004/0052418 A1 | 3/2004 | DeLean |
| 2004/0052450 A1 | 3/2004 | Morrison |
| 2004/0061782 A1 | 4/2004 | Kinjo |
| 2004/0066966 A1 | 4/2004 | Schneiderman |
| 2004/0074973 A1 | 4/2004 | Schneck et al. |
| 2004/0091111 A1 | 5/2004 | Levy et al. |
| 2004/0127277 A1 | 7/2004 | Walker et al. |
| 2004/0145602 A1 | 7/2004 | Sun et al. |
| 2004/0156535 A1 | 8/2004 | Goldberg et al. |
| 2004/0158724 A1 | 8/2004 | Carr et al. |
| 2004/0163118 A1 | 8/2004 | Mottur |
| 2004/0168118 A1 | 8/2004 | Wong et al. |
| 2004/0174434 A1 | 9/2004 | Walker et al. |
| 2004/0201709 A1 | 10/2004 | McIntyre et al. |
| 2004/0218099 A1 | 11/2004 | Washington |
| 2004/0221163 A1 | 11/2004 | Jorgensen et al. |
| 2004/0223058 A1 | 11/2004 | Richter et al. |
| 2004/0235551 A1 | 11/2004 | Walker et al. |
| 2004/0241748 A1 | 12/2004 | Ault-Riche et al. |
| 2004/0243671 A9 | 12/2004 | Needham et al. |
| 2004/0268096 A1 | 12/2004 | Master |
| 2005/0010649 A1 | 1/2005 | Payne et al. |
| 2005/0025355 A1 | 2/2005 | Simard |
| 2005/0025357 A1 | 2/2005 | Landwehr |
| 2005/0033758 A1 | 2/2005 | Baxter |
| 2005/0039040 A1 | 2/2005 | Ransom et al. |
| 2005/0062849 A1 | 3/2005 | Foth et al. |
| 2005/0064928 A1 | 3/2005 | Baerlocher et al. |
| 2005/0068571 A1 | 3/2005 | Hart et al. |
| 2005/0068572 A1 | 3/2005 | Hart et al. |
| 2005/0071519 A1 | 3/2005 | Hart et al. |
| 2005/0071520 A1 | 3/2005 | Hull et al. |
| 2005/0071746 A1 | 3/2005 | Hart et al. |
| 2005/0078172 A1 | 4/2005 | Harville et al. |
| 2005/0097179 A1 | 5/2005 | Orme |
| 2005/0105803 A1 | 5/2005 | Ray |
| 2005/0105805 A1 | 5/2005 | Nicponski |
| 2005/0143136 A1 | 6/2005 | Lev et al. |
| 2005/0161512 A1 | 7/2005 | Jones et al. |
| 2005/0171787 A1 | 8/2005 | Zagami |
| 2005/0171843 A1 | 8/2005 | Brazell |
| 2005/0187883 A1 | 8/2005 | Bishop et al. |
| 2005/0195292 A1 | 9/2005 | McIntyre |
| 2005/0210417 A1 | 9/2005 | Marvit et al. |
| 2005/0210418 A1 | 9/2005 | Marvit |
| 2005/0212749 A1 | 9/2005 | Marvit et al. |
| 2005/0212750 A1 | 9/2005 | Marvit et al. |
| 2005/0212751 A1 | 9/2005 | Marvit et al. |
| 2005/0212752 A1 | 9/2005 | Marvit et al. |
| 2005/0212753 A1 | 9/2005 | Marvit et al. |
| 2005/0212754 A1 | 9/2005 | Marvit et al. |
| 2005/0212755 A1 | 9/2005 | Marvit |
| 2005/0212756 A1 | 9/2005 | Marvit et al. |
| 2005/0212757 A1 | 9/2005 | Marvit et al. |
| 2005/0212759 A1 | 9/2005 | Marvit et al. |
| 2005/0212760 A1 | 9/2005 | Marvit et al. |
| 2005/0212766 A1 | 9/2005 | Reinhardt et al. |
| 2005/0212767 A1 | 9/2005 | Marvit et al. |
| 2005/0212911 A1 | 9/2005 | Marvit et al. |
| 2005/0216139 A1 | 9/2005 | Laughlin et al. |
| 2005/0216339 A1 | 9/2005 | Brazell et al. |
| 2005/0216867 A1 | 9/2005 | Marvit et al. |
| 2005/0226170 A1 | 10/2005 | Relan et al. |
| 2005/0245233 A1 | 11/2005 | Anderson |
| 2005/0246757 A1 | 11/2005 | Relan et al. |
| 2005/0256724 A1 | 11/2005 | Rasin et al. |
| 2005/0257055 A1 | 11/2005 | Anderson |
| 2005/0262343 A1 | 11/2005 | Jorgensen et al. |
| 2005/0271246 A1 | 12/2005 | Sharma et al. |
| 2005/0282576 A1 | 12/2005 | Delker et al. |
| 2005/0286743 A1 | 12/2005 | Kurzweil et al. |
| 2005/0288932 A1 | 12/2005 | Kurzweil et al. |
| 2006/0055825 A1* | 3/2006 | Shiota et al. .................. 348/563 |
| 2006/0104504 A1 | 5/2006 | Sung |
| 2006/0227384 A1 | 10/2006 | Kawada |
| 2006/0262962 A1 | 11/2006 | Hull et al. |
| 2006/0262976 A1 | 11/2006 | Hart et al. |
| 2006/0265489 A1 | 11/2006 | Moore |
| 2006/0268121 A1 | 11/2006 | Watanabe |
| 2006/0274949 A1 | 12/2006 | Gallagher |
| 2006/0280427 A1 | 12/2006 | Snowdon et al. |
| 2006/0282323 A1 | 12/2006 | Walker et al. |
| 2006/0285172 A1 | 12/2006 | Hull et al. |
| 2006/0285772 A1 | 12/2006 | Hull et al. |
| 2006/0287045 A1 | 12/2006 | Walker et al. |
| 2006/0293956 A1 | 12/2006 | Walker et al. |
| 2007/0002360 A1 | 1/2007 | Levien et al. |
| 2007/0003113 A1 | 1/2007 | Goldberg |
| 2007/0004505 A1 | 1/2007 | Walker et al. |
| 2007/0005651 A1 | 1/2007 | Levien et al. |
| 2007/0016790 A1 | 1/2007 | Brundage et al. |
| 2007/0046982 A1 | 3/2007 | Hull et al. |
| 2007/0046983 A1 | 3/2007 | Hull et al. |
| 2007/0047002 A1 | 3/2007 | Hull et al. |

| | | |
|---|---|---|
| 2007/0047008 A1 | 3/2007 | Graham et al. |
| 2007/0047780 A1 | 3/2007 | Hull et al. |
| 2007/0047781 A1 | 3/2007 | Hull et al. |
| 2007/0047782 A1 | 3/2007 | Hull et al. |
| 2007/0047816 A1 | 3/2007 | Graham et al. |
| 2007/0047818 A1 | 3/2007 | Hull et al. |
| 2007/0047819 A1 | 3/2007 | Hull et al. |
| 2007/0050341 A1 | 3/2007 | Hull et al. |
| 2007/0050360 A1 | 3/2007 | Hull et al. |
| 2007/0050411 A1 | 3/2007 | Hull et al. |
| 2007/0050419 A1 | 3/2007 | Weyl et al. |
| 2007/0050712 A1 | 3/2007 | Hull et al. |
| 2007/0052997 A1 | 3/2007 | Hull et al. |
| 2007/0055697 A1 | 3/2007 | Parlin et al. |
| 2007/0061040 A1 | 3/2007 | Augenbraun et al. |
| 2007/0061043 A1 | 3/2007 | Ermakov et al. |
| 2007/0061266 A1 | 3/2007 | Moore |
| 2007/0061487 A1 | 3/2007 | Moore |
| 2007/0079137 A1 | 4/2007 | Tu |
| 2007/0086660 A1 | 4/2007 | Ai et al. |
| 2007/0086773 A1 | 4/2007 | Ramsten et al. |
| 2007/0091366 A1 | 4/2007 | McIntyre |
| 2007/0091376 A1 | 4/2007 | Calhoon et al. |
| 2007/0094721 A1 | 4/2007 | Nguyen et al. |
| 2007/0098172 A1 | 5/2007 | Levy et al. |
| 2007/0104472 A1 | 5/2007 | Quan |
| 2007/0106721 A1 | 5/2007 | Schloter |
| 2007/0118536 A1 | 5/2007 | McIntyre |
| 2007/0130599 A1 | 6/2007 | Monroe |
| 2007/0140532 A1 | 6/2007 | Goffin |
| 2007/0158403 A1 | 7/2007 | Ertas |
| 2007/0165904 A1 | 7/2007 | Nudd et al. |
| 2007/0172155 A1 | 7/2007 | Guckenberger |
| 2007/0296835 A1 | 12/2007 | Olsen |
| 2008/0112621 A1 | 5/2008 | Gallagher |
| 2010/0014721 A1* | 1/2010 | Steinberg et al. ............. 382/118 |

FOREIGN PATENT DOCUMENTS

| | | |
|---|---|---|
| JP | 2004005535 | 1/2004 |
| JP | 2004064385 | 2/2004 |
| JP | 2004192129 | 7/2004 |
| JP | 2004201228 | 7/2004 |
| JP | 2005215750 | 8/2005 |
| JP | 2006121586 | 5/2006 |
| JP | 2006217277 | 8/2006 |
| JP | 2006301829 | 11/2006 |
| JP | 2006352369 | 12/2006 |
| JP | 2007102683 | 4/2007 |
| JP | 2007248852 | 9/2007 |

OTHER PUBLICATIONS

Face recognition http://www.digicamhelp.com/camera-features/shooting-modes/face-detection.php, May 22, 2008.

Up-next: Cameras that know who you photographed http://news.cnet.com/8301-13580_3-9816371-39.html, Nov. 14, 2007.

* cited by examiner

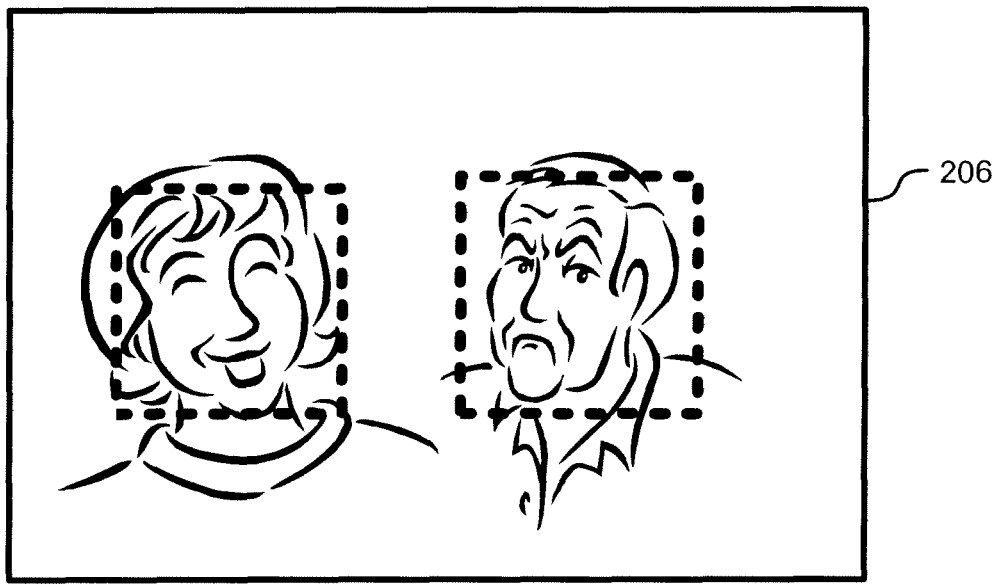
Fig. 3

IMAGE SHARING SYSTEM AND METHOD

TECHNICAL FIELD

The present invention relates to digital image sharing and transfer, and more particularly, some embodiments relate to image capture and recognition to facilitate image identification and sharing among systems and devices.

DESCRIPTION OF THE RELATED ART

Photography is derived from the Greek words photos, meaning light, and graphein, meaning to draw. It is widely believed that the word was first used by the scientist Sir John F. W. Herschel in 1839. Photography originally involved the recording of images as a result of light impinging on a photosensitive material. Early photographs were exposed as positives onto metal plates that had been sensitized to accept the image. Examples of such include Daguerreotypes, which were metal sheets upon which a positive silver image was made, and tintypes, in which a thin sheet of iron provided a base for light-sensitive material. It is William Henry Fox Talbot, however, that is often credited with inventing a process of capture the image on a negative, and using the negative to create prints. Eventually, photography evolved into a process by which the sensitized materials were coated on plate glass.

Perhaps the most significant historical advancement was in 1889, when George Eastman used a film comprised of emulsions coated on a flexible base. The flexibility this film meant that it could be rolled into a smaller package, enabling cameras to be made much smaller than was previously practical. This enabled small, cost effective cameras to be mass produced and available to the public in unprecedented volumes. Later, color films were introduced and made commercially viable.

Photography has evolved from its earliest forms into a variety of different photographic platforms. For example, other forms of radiation such as infrared, X-Ray or other radiation might be used to record images. As yet a further example of the evolution of photography, sequences of images can be captured and replayed as motion pictures. More recently, a major advancement of photography has been the commercialization of digital still and motion photography. With digital cameras, light sensitive semiconductor devices, such as charge-coupled devices, are used to capture the image and processing technology is used to capture the image and store it in a memory or other storage device.

With advances in electronics, consumers have available to them a multitude of photographic and other image capture devices that were previously unavailable. Improvements in power consumption, storage densities, miniaturization and display technology, to name a few, have enabled rapid advances in image capture devices. Take, for instance, electronic content capture, storage, view and delivery devices such as, for example, digital cameras, digital video cameras and the like. Such devices are commonplace in contemporary society at the consumer, professional and prosumer level. Digital cameras, camera phones, video cameras and players, digital photo albums, and other image capture devices are seemingly ubiquitous. With the proliferation of such image capture devices, more and more users are seeking the ability to share images amongst their family, friends and coworkers. Digital still and motion images are frequently transferred electronically among these groups using, for example, email and other transport mechanisms.

BRIEF SUMMARY OF EMBODIMENTS OF THE INVENTION

According to various embodiments of the invention an image capture device, for recording, storing, transferring or displaying images can be provided with a body; an optical element disposed on the body; an image sensor coupled to the optical element; an image processor coupled to the image sensor; a wireless communications interface coupled to the image processor; and a display. The image capture device might further be implemented to include executable program code embodied in a computer readable medium and configured to cause the image processor to: process image data associated with a first facial area in a first image to determine a first data set of parameters associated with the first facial area; scan one or more subsequent images stored in memory accessible by the image processor; identify facial areas in the subsequent images and process image data associated with identified facial areas in the subsequent images to determine subsequent data sets of parameters associated with identified facial areas; and compare the first and subsequent data sets to determine whether the one or more subsequent images includes a same face as the face highlighted in the first image. Memory might be included and configured to store a image data associated with a predetermined facial area.

In one embodiment, the executable program code further comprises second code configured to cause the image processor determine the image data associated with a first facial area in a first image, the second code comprising code that, when executed by the image processor, further causes the image processor to: scan a first image; identify one or more faces in the scanned first image; display the first image to a user with one or more facial areas associated with the identified one or more faces highlighted; and to accept from the user a selection of a facial area. The digital camera can be configured such that the first image is received by the digital camera from another electronic device over the communication interface, and such that subsequent images that are identified by the digital camera as including a same face as the face highlighted in the first image are sent over the communication interface to the other device.

In another embodiment, the digital camera is implemented such that the first image is received by the digital camera from another electronic device over the communication interface, and subsequent images that are identified by the digital camera as including a same face as the face highlighted in the first image are sent over the communication interface to the other device.

The digital camera can be configured such that executable program code is further configured to receive a predetermined data set of parameters associated with a facial area from another electronic device and the comparison comprises comparing the predetermined and subsequent data sets to determine whether the one or more subsequent images includes a same face as a face in an external image from which the predetermined data set was obtained. The communication interface can be implemented with a variety of wired or wireless technologies including, for example, ultra wideband, WiFi, Bluetooth, 802.xx or other wired or wireless communication interfaces.

In yet another embodiment, a digital camera is configured to include an image sensor; a lens configured to focus a scene onto the image sensor; an image processor coupled to receive data from the image sensor representing the scene and configured to create an image of the scene, wherein the image can be represented as a data file; a memory coupled to the image processor; a communication interface coupled to the image processor; executable program code embodied in a computer readable medium and configured to cause the image processor to: scan a first image received from another electronic device via the communication interface; identify a face in the scanned first image; process image data associated with facial area of the face to determine a first data set of parameters associated with the selected facial area; scan one or more subsequent images stored in memory; identify one or more facial areas in the one or more subsequent images and process image data associated with the one or more identified facial areas to determine one or more subsequent data sets of parameters associated with the one or more identified facial areas; and compare the first and subsequent data sets to determine whether one or more images in memory include a same face as the face in the first image. The digital camera can be configured such that the memory further includes storage area configured to store an image of the user's face.

In one embodiment, the executable program code further causes the processor to scan a plurality of subsequent images to identify facial areas in the subsequent images, process image data associated with the identified facial areas in the subsequent images to determine a subsequent data sets of parameters associated with the facial areas; and compare the first and subsequent data sets to determine whether and which of the subsequent images include a same face as the face highlighted in the first image. In another embodiment, the executable program code further causes the processor to identify a plurality of faces in the scanned image; display the image to the user with the plurality of faces highlighted; and accept a user selection of a subset of the plurality of faces highlighted to arrive at the facial area to be processed.

In still another embodiment, a method of sharing selected images among digital cameras is provided. The digital cameras can be configured to include an image processor configured to perform the method of: scanning an image in a digital camera to identify one or more features in the image; highlighting any identified features and displaying the image with the highlighted features to the user; accepting from the user a selection of a highlighted feature; processing image data associated with the selected feature to obtain a first dataset of parameters associated with the feature; scanning one or more subsequent images in a data file; identifying one or more features of the one or more subsequent images; processing image data associated with the one or more features of the one or more subsequent images to determine one or more subsequent data sets of parameters associated with the one or more features; and comparing the fist and subsequent data sets to determine whether the one or more scanned subsequent images contain the same feature selected by the user.

The method can further include sending subsequent images that contain the same feature to another digital camera, to a digital photo album or printer or to another electronic device. A registered feature of a user can be stored in the digital camera for use in identifying subsequent images containing the registered feature.

In yet another embodiment, a method of sharing selected images among digital cameras is presented. The digital cameras can include an image processor configured to perform the method of: receiving an image from another digital camera, the image containing a selected feature; processing image data associated with the selected feature to obtain a first dataset of parameters associated with the feature; scanning one or more subsequent images in a data file; identifying one or more features of the one or more subsequent images; processing image data associated with the one or more features of the one or more subsequent images to determine one or more subsequent data sets of parameters associated with the one or more features; and comparing the fist and subsequent data sets to determine whether the one or more scanned subsequent images contain the same feature selected by the user. The method can further include sending subsequent images that contain the same feature to another digital camera, to a digital photo album or printer or to another electronic device. A registered feature of a user can be stored in the digital camera for use in identifying subsequent images containing the registered feature.

In still a further embodiment, a computer program product is provided wherein a computer program for causing a computer system to select and operate on images is embodied on a computer-readable medium; said computer program implementing: scanning a first image stored on the computer system; highlighting any identified features and displaying the image with the highlighted features to the user; accepting from the user a selection of a highlighted feature; processing image data associated with the selected feature to obtain a first dataset of parameters associated with the feature; scanning one or more subsequent images stored in memory accessible by the image processor; identifying facial areas in the subsequent images and process image data associated with identified facial areas in the subsequent images to determine subsequent data sets of parameters associated with identified facial areas; and compare the first and subsequent data sets to determine whether the one or more subsequent images includes a same face as the face highlighted in the first image.

In one embodiment, the computer program product is further configured to send one or more subsequent images containing the same face to a predetermined recipient. In another embodiment, the steps of scanning one or more subsequent images, identifying facial areas therein, comparing their datasets and sending images containing the same face to a predetermined recipient are performed automatically upon receipt of newly received subsequent images. In yet another embodiment, the steps of scanning one or more subsequent images, identifying facial areas therein, comparing their datasets and sending images containing the same face to a predetermined recipient are performed automatically at a predetermined time.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 3 is a diagram illustrating an example of feature highlighting in accordance with one embodiment of the invention.

FIG. 9, which comprises

FIG. 12, which comprises

Figure 1:
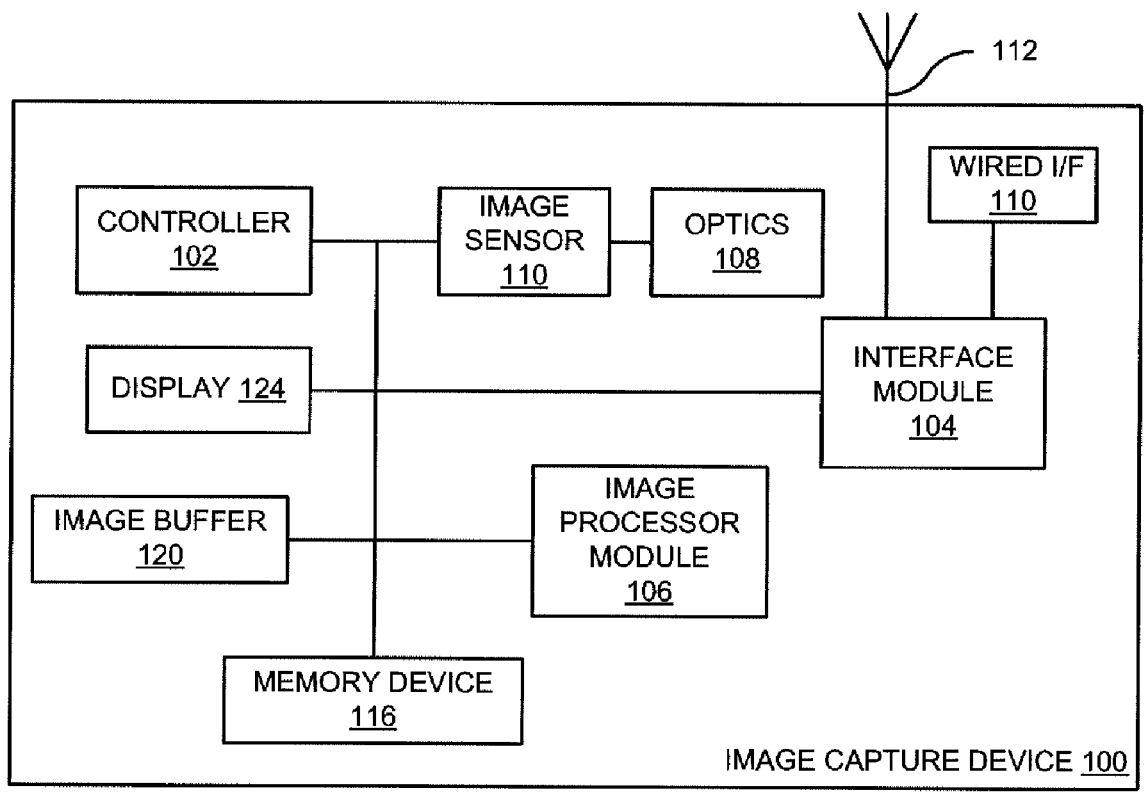
FIG. 1 is a diagram illustrating an exemplary block diagram of an image capture device in accordance with an example environment of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a system and method for a novel image sharing amongst image content devices such as, for example, digital still and motion image cameras, and other electronics devices capable of storing, transferring or displaying images. Particularly, in one embodiment, image recognition capabilities are used to allow certain images to be selected from a group of images. In a further embodiment, the selected images can be moved, shared, transferred, stored, printed, deleted, or otherwise operated on, as may be useful or desired.

Before describing the invention in detail, it is useful to describe an example electronic device with which the invention can be implemented. One such example is that of a digital camera. In one example, a digital camera can include a series of optical elements (i.e., a lens) that is configured to focus light to create an image of a scene. With digital cameras, however, instead of focusing this light onto a conventional light sensitive film at the focal plane, the scene is focused onto a semiconductor image sensor, such as, for example, a CCD (charge coupled device) or CMOS (complementary metal oxide semiconductor) image sensor. The image sensor has several cells, corresponding to pixels, that respond electronically to the light focused thereon. In other words, the image sensors convert light into electrons. The accumulated charge for each cell is read out as an electrical signal, which, for a CCD, is converted into a digital pixel value in binary form. The CMOS signal is digital, so conversion is not necessary. The electrical signals created are clocked out of the sensor and processed into an image comprised of several digital pixels. The images can be stored locally in fixed or removable memory and later transferred to a computer or other external host.

Because a digital image is created and stored, it can also be displayed. This allows the photographer to view the image on a display after the photograph is taken. LCD display panels, for example, are commonplace on digital cameras and digital video cameras to allow image viewing. As such, electrical interfaces and drivers are provided to allow a preview of the image to be viewed as well as to display the exposed image stored in memory. Such displays might also provide a user interface for additional features such as displaying exposure characteristics, facilitating camera set up through menus or other like means, as well as displaying operational modes of the camera (for example, flash status, exposure compensation, focus mode, shutter/aperture settings and the like). Some cameras even use touch screen displays as a form of user interface to allow control and selections to be performed with a minimal use of buttons and switches. This is popular with some digital video cameras.

From time-to-time, the present invention is described herein in terms of this example electronic. Description in terms of these environments is provided to allow the various features and embodiments of the invention to be portrayed in the context of an exemplary application. After reading this description, it will become apparent to one of ordinary skill in the art how the invention can be implemented in different and alternative electronic devices beyond still and motion digital cameras, including, for example, printers, digital photo albums, computers and computing devices, mobile telephones, PDAs, image playback devices, monitors, televisions and any of a number of other electronic devices.

The present invention is directed toward a system and method for sharing images among electronic content devices such as, for example, those just listed above. In accordance with one or more embodiments of the invention, one or more devices might include features such as, for example, image processing and recognition capabilities to allow images to be identified or selected based on image features or characteristics. The devices might further include a user interface to allow users to identify features or characteristics to be used to search for and identify such images, to allow users to store and view features for later selection and use, and to store profiles or operations that can be performed on identified or selected images. Additionally wired or wireless data transfer capabilities can be included to allow selected images to be transferred among electronic devices. In the case of a digital camera or other device, the user interface might include, in addition to a GUI, keys, buttons, switches, thumb wheels, d-pads, joysticks or other input devices to allow the entry of user data and commands.

FIG. 1 is a diagram illustrating an exemplary block diagram of an image capture device in accordance with one embodiment of the invention. Referring now to FIG. 1, the example image capture device 100 illustrated includes a controller 102, a interface module 104, an image processing module 106, optics 108, an image sensor 114, a wireless interface 112, a hardwired interface 110, a memory or other storage device 116, a removable storage device 118, an image buffer 120, and a display 124. Display 124 might be an LCD or other like display configured to display a scene to be selected for photographing, a captured image, camera menus and other features.

In the illustrated example implementation, image capture device 100 includes one or more optical elements 108 that can be used to capture a scene and focus the scene onto a focal plane. Optics 108 might typically include a plurality of optical elements that are configured to operate together to provide the ability to zoom into and out of the scene as well as to focus the scene onto the focal plane. Optical elements 108 can be implemented in a relatively simple fashion such as, for example, a fixed-aperture single-element lens, or a more complex structure such as a multi-element variable-aperture lens. Additionally, manual or auto focusing features can be provided.

As noted, optics 108 are typically used to focus a scene onto a focal plane. An image sensor 114 might be provided at the focal plane to receive the optical image and convert it into an electrical signal representative thereof. As discussed above in the description of an example environment, an image sensor 114 might be implemented as a CCD or CMOS image sensor, which is a semiconductor device configured to accept the light focused thereon and output an electrical representation of the optical image. Depending on the type of image sensor utilized, an analog-to-digital converter might be provided to divert the electrical signals to a digital format such that the image can be processed, for example, by an image processing module 106. Image sensors might be implemented to provide color data for color images.

An image processing module 106 can be included to process the digital image data to create a digital picture or digital rendition of the image captured. For example, image processing might include processing functions used to format the digital data into an appropriate image format, perform any desired image processing such as, for example, sharpening, smoothing, light balancing, and so on; performing image compression, and creating the appropriate image file format such as, for example, JPEG, TIFF and the like.

A processed image or a raw image file might be stored on a variety of storage devices such as, for example, a memory device 116 or a removable memory element 118. For example, various forms of internal and removable memory might be provided to facilitate local storage as well as removable storage. An example of removable memory might include, for example, a removable flash memory card. Also illustrated in the example of FIG. 1 is an image buffer 120 that might be provided to buffer the processed image for display on display 104. Image buffer might also be used to buffer for display preview images before a picture is actually taken. Memory device 116 might also store software or other processing functions used to process images or otherwise control the operation of image capture device 100. Additionally, memory device 116 might store menu screens and other like devices for display to the user during set up or configuration operations.

A controller 102 might be provided to control the various functions of the image capture device 100 as described herein. A controller 102 might be implemented utilizing various forms of control logic including, for example, processors, controllers, ASICs, PLAs, discrete logic and the like. For example, a controller 102 might control functions such as auto-focus functions, camera set-up functions, image transfer functions, image recognition and selection functions, and so on.

Also illustrated in the image capture device 100 of FIG. 1 is a interface module 104 that is communicatively coupled to a wired interface 110 and a wireless interface 112. Interface module 104 might be used for a variety of applications including providing a communications interface to other electronic devices including printers, other cameras, computer systems, networks and the like. A variety of wireless communication protocols might be implemented to provide the interface depending on the operational environment anticipated. For example, the bandwidth required for transferring images, the desired range of operation, the desired speed of operation, and other like parameters may drive the choice of the wireless interface. In one example embodiment, wireless interfaces such as, for example, the WiMedia OFDM specification, Bluetooth, 802.11, and other interfaces might be utilized. In addition to these standards-based interfaces, proprietary interfaces might also be utilized.

Additionally, hardwired interfaces to facilitate image sharing can be included separate from or complimentary with wireless interface 112. For example, a wired interface 110 might be used to facilitate faster image transfer or to accommodate higher bandwidth than wireless interface 112. Additionally, a wired interface might provide features such as power transfer to allow the device to be powered by a power source. As this example illustrates, a wired interface might be as simple as a pair of power connections to a powering or charging of the display, or might be configured to include additional connection for serial or parallel data communication.

Figure 2:
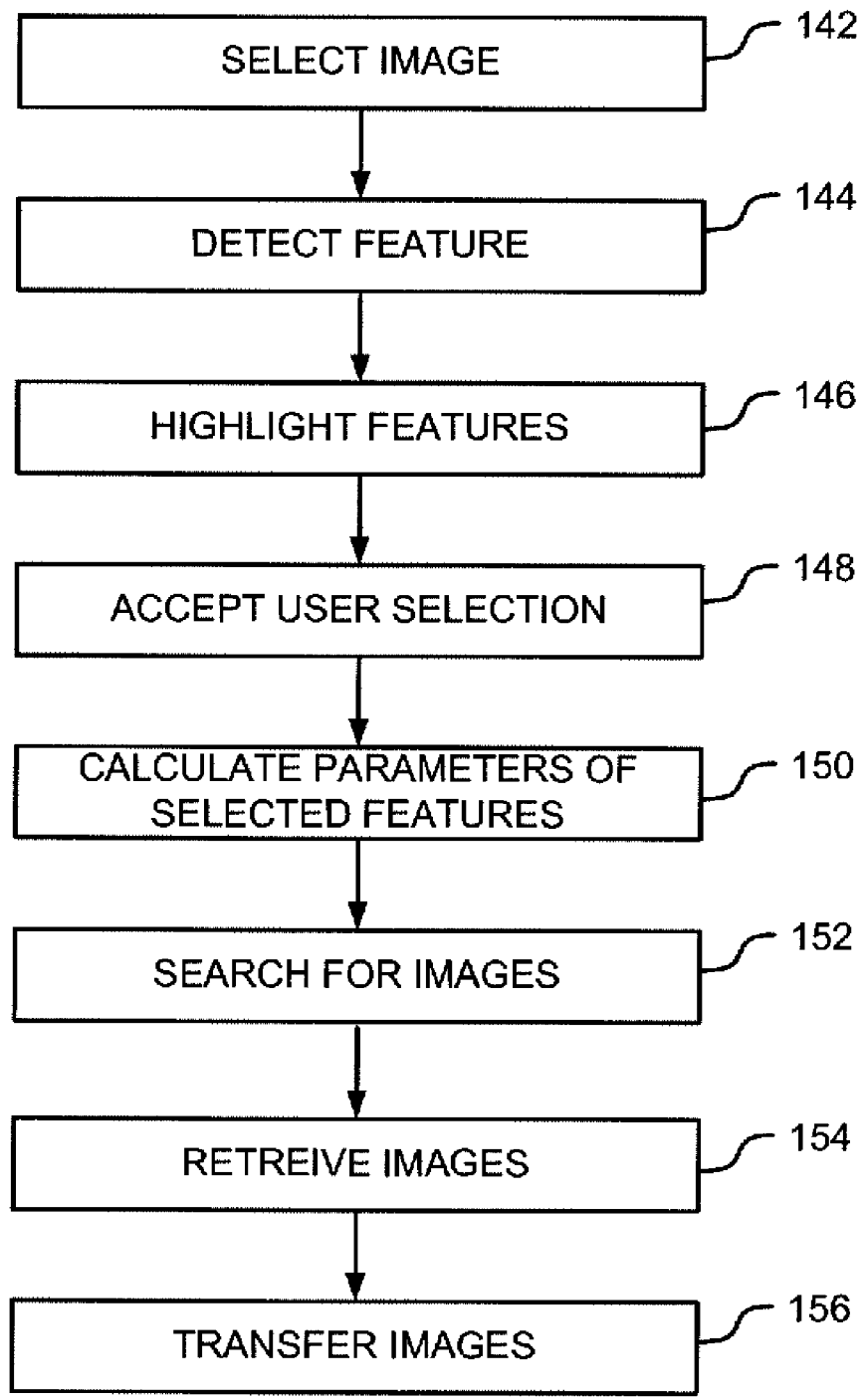
FIG. 2 is a diagram illustrating an example process for selecting and operating on content items in accordance with one embodiment of the invention.

Having thus described an example of digital camera with which the present convention can be implemented, an example operation of the invention in accordance with one embodiment is now described. FIG. 2 is a diagram illustrating an example process for selecting and operating on content items in accordance with one embodiment of the invention. In the example illustrated in FIG. 2, the content items being operated on are images such as, for example, digital still photographs, and the example operation is a transfer of those images to another electronic device. With reference to FIG. 2, the invention is described in terms of an example application wherein images are searched, selected and transferred based on facial characteristics and face recognition processes. In other words, in the described example, faces of persons in the images are located; the images comprising those faces are processed to identify facial features, characteristics or other parameters to identify the person to which the face belongs; and images are selected based on whether a person's face appears in the image. In other words, images can be selected based on whether a person appears in those images. As will be apparent to one of ordinary skill in the art after reading this discussion, other features in addition to or in place of faces can be searched and selected in accordance with the convention. However, the invention is described in terms of this example to facilitate ease of discussion.

Referring now to FIG. 2, in a Step 142 an image is selected. For example, one of a plurality of images in a directory or other storage structure can be identified by user as a photograph having a picture of a person for whom the user wishes to identify additional photographs. For example, a user may have identified an image that includes a picture of the user herself, and the user would like to find additional images that include pictures of herself, so that she can send those pictures to friends or family. As such, the user can identify the image to the electronic device. Additionally, in another embodiment, the electronic device may select one or more images itself and present them to the user so that the user can determine which image has features (in this example faces) the user wishes to identify. For example, the electronic device may pull images one by one and present them to the user or may search among the directories of files to select images that have one or more faces so that those particular images can be presented to the user for selection. Preferably, in one embodiment, one image is selected for the operation.

In a Step 144, the searchable features of the selected image are detected. In terms of the present example, the selected image is scanned and the one or more faces that may appear in the image are detected. Conventional, well-known image processing techniques can be utilized to identify the faces or other features that appear in the content item. In another embodiment, the image is presented to the user and the user manually identifies one or more faces or other features. This can be done, for example, using pointing devices, drawing tools, highlighting tools and so on.

In a Step 146, the image is displayed to the user with the faces highlighted. For example, in one embodiment, the image can be displayed with boxes or other shapes surrounding the faces such that the user can select one of the identified faces. In one embodiment, the invention can be implemented to identify those faces in the image that are of sufficient quality, resolution, or other detail to enable adequate face recognition operations to be performed. As such, in one embodiment, an image might be presented wherein fewer than all of the faces in the image are highlighted and available for selection. In one embodiment where the user is provided with a plurality of highlighted faces on an image, but the user wishes to select a face that is not highlighted, the system can be implemented so as to allow the user to select another image for feature detection and identification.

An example of feature highlighting is illustrated in FIG. 3. Referring now to FIG. 3, the selected image 204 is illustrated as it appears without feature highlighting. Image 206 is an illustration of the same image but with faces highlighted using in this example boxes. As this example illustrates, the image can be displayed to the user such that the user can be informed which faces can be selected for image searching.

With the features highlighted, the user can select the face of the person whose pictures he or she wishes to identify and transfer. Buttons, knobs, switches, d-pads, touchscreen displays and other user interfaces can be provided on the electronic device to enable the user to make such a selection. For example, a thumbwheel, joystick d-pad or other like pointing device can be used to allow the user to toggle between the various highlighted faces.

In addition to drawing a box or other shape around the faces, other methodologies can be utilized to highlight the selected faces or other features. For example, selectable faces can be highlighted with increased brightness, contrasting colors, by converting the selectable faces to black and white, and so forth. In one embodiment, it is preferred that borders such as the boxes illustrated in FIG. 3 are utilized so that the faces the user is selecting are relatively unobscured or unaltered by the process.

Referring again to FIG. 2, in a Step 148, the electronic device accepts the user's selection. In a Step 150, the device reads the pixel values or other information associated with the selected face and, through image processing techniques, calculates the parameters of the selected face. For example, popular recognition algorithms can be used including eigenface, Fisherface, the hidden Markov model, and Neuronal Motivated Dynamic Link matching. These are only a few examples of recognition algorithms and these and other algorithms, including those yet to be developed, can be utilized. The hidden Markov model, for example, is a statistical model that assumes the face being modeled is a Markov process with unknown parameters, and uses observable parameters to determined the hidden parameters. The extracted parameters are used to perform the pattern recognition. With the facial recognition process completed, a resulting data set used to identify the highlighted face can be stored. The data set might take on a variety of different forms depending on the models used for recognition, for example.

In a Step 152, the electronic device searches among the other images in an attempt to locate additional images that have the same face contained therein. For example, particular directories or other data structures might be identified in which to conduct the search. The identified directories are accessed and the images can be scanned to identify faces contained in those images. For the identified faces, the facial recognition algorithms can be run to determine whether the same face appears in these additional scanned images. Preferably, the same facial recognition algorithm is run in Step 152 as was run in Step 150, to help to insure that accurate matches can be determined.

In a Step 154, images identified as containing the same face are retrieved and these retrieved images can be operated on in a Step 156. For example, retrieved images in one embodiment can be stored and sent to another electronic device. As a further example, the user may wish to scan a directory that contains pictures of his or her best friend, identify and select those pictures, and have those pictures sent to his or her best friend. Thus, the process described above with respect to FIG. 2 can be utilized to perform that function for the user. As another example, a user may wish to search a website for pictures that include his or her favorite athlete, and to download those pictures. As such, the above process can be used to download the images from the website, scan them for the athlete's picture, and save the identified pictures in a directory for the user.

In addition to or instead of saving the pictures, the user may wish to perform another operation such as, for example, printing the identified pictures. Accordingly, in one embodiment, in a Step 156, the images identified by the electronic device can be sent to a printer for printing. Similarly, the identified images can be sent to a CD or DVD writer or other storage device such that they can be stored to a removable medium. As another example, selected pictures might be sent to an electronic photo album or other display device for display. As these examples illustrate, there are a number of different applications in which the invention can be implemented. As these examples also illustrate, images identified by an electronic device can be shared among the plurality of other devices via a wired or wireless communication interface for example, over a direct or networked connection.

Figure 4:
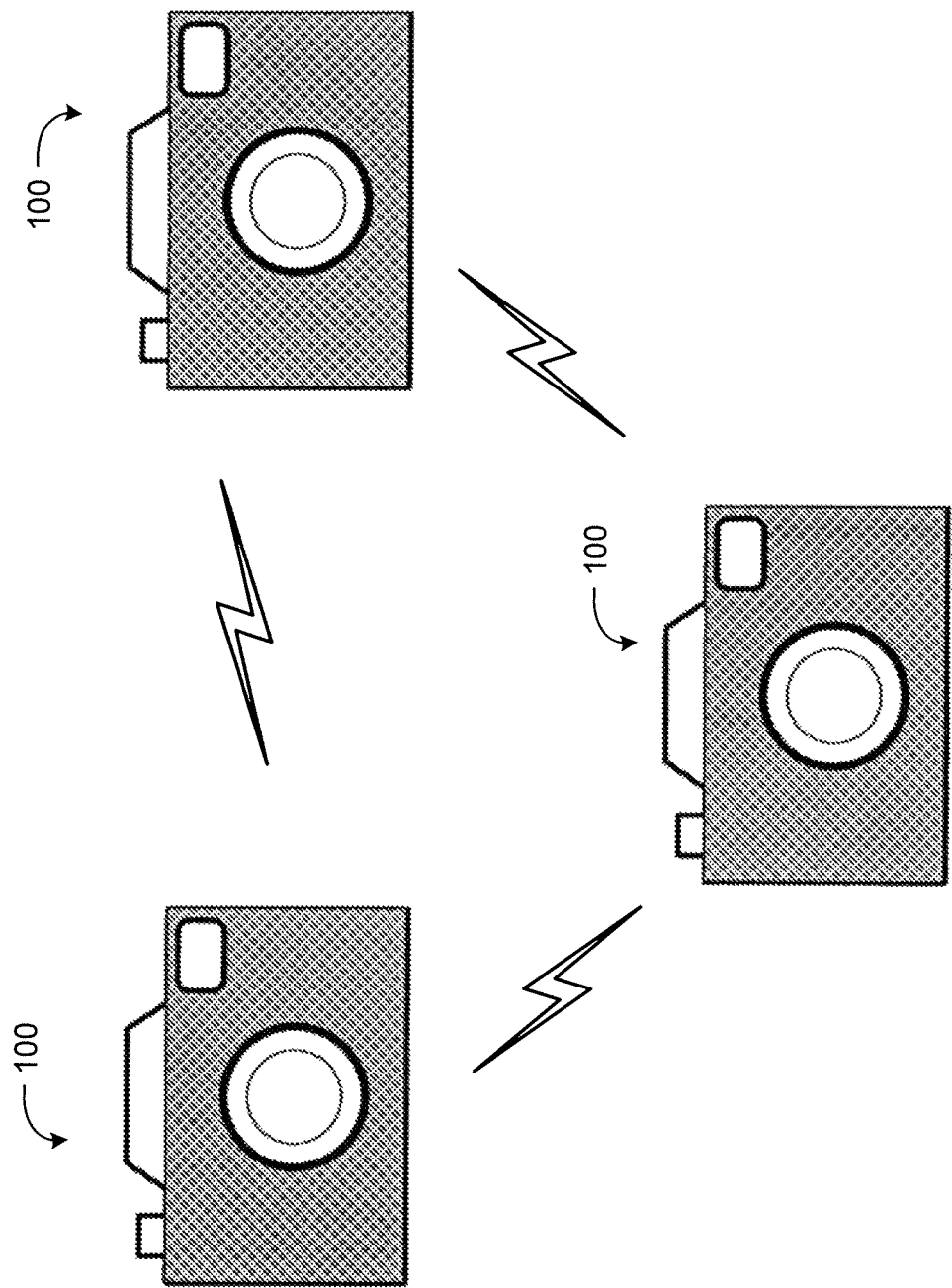
FIG. 4 is a diagram illustrating an example of image sharing among a plurality of digital still cameras each having a wireless interface in accordance with one embodiment of the invention.

A few simple examples of content sharing among electronic devices are now described. FIG. 4 is a diagram illustrating an example of image sharing among a plurality of digital still cameras 100 each having a wireless interface. Referring now to FIG. 4, one or more of the illustrated cameras 100 can include features and functionality described herein with respect to the present invention. A camera 100 having this feature can allow a user to select features to be searched such as, for example, one or more faces of individuals in one or more photographs. The camera can then search in its memory (fixed or removable) or other storage device for additional images containing this feature and share those images amongst the other electronic devices 100 (in this case digital cameras) as may be identified by the user.

For example, consider a scenario where a plurality of friends are enjoying an outing, each with their own digital camera and each taking pictures of various scenes. Consider further that after their outing they wish to share various of these pictures among themselves. For example, one of the users may wish to have pictures from the other cameras that include pictures of his or her best friend. In this example, each of the users can select an image that has a picture of that person, highlight that person's face, and initiate a search on their camera for images that were taken and stored and that include that person therein. Those images will then be sent to the requesting user via the communications interface. In another example, one of the users may wish to have photographs from the other cameras of particular landmarks or other items of interest. Similar image processing algorithms can be utilized to identify pictures containing those landmarks or other items such that those images can be collected and sent to the requesting user.

Figure 5:
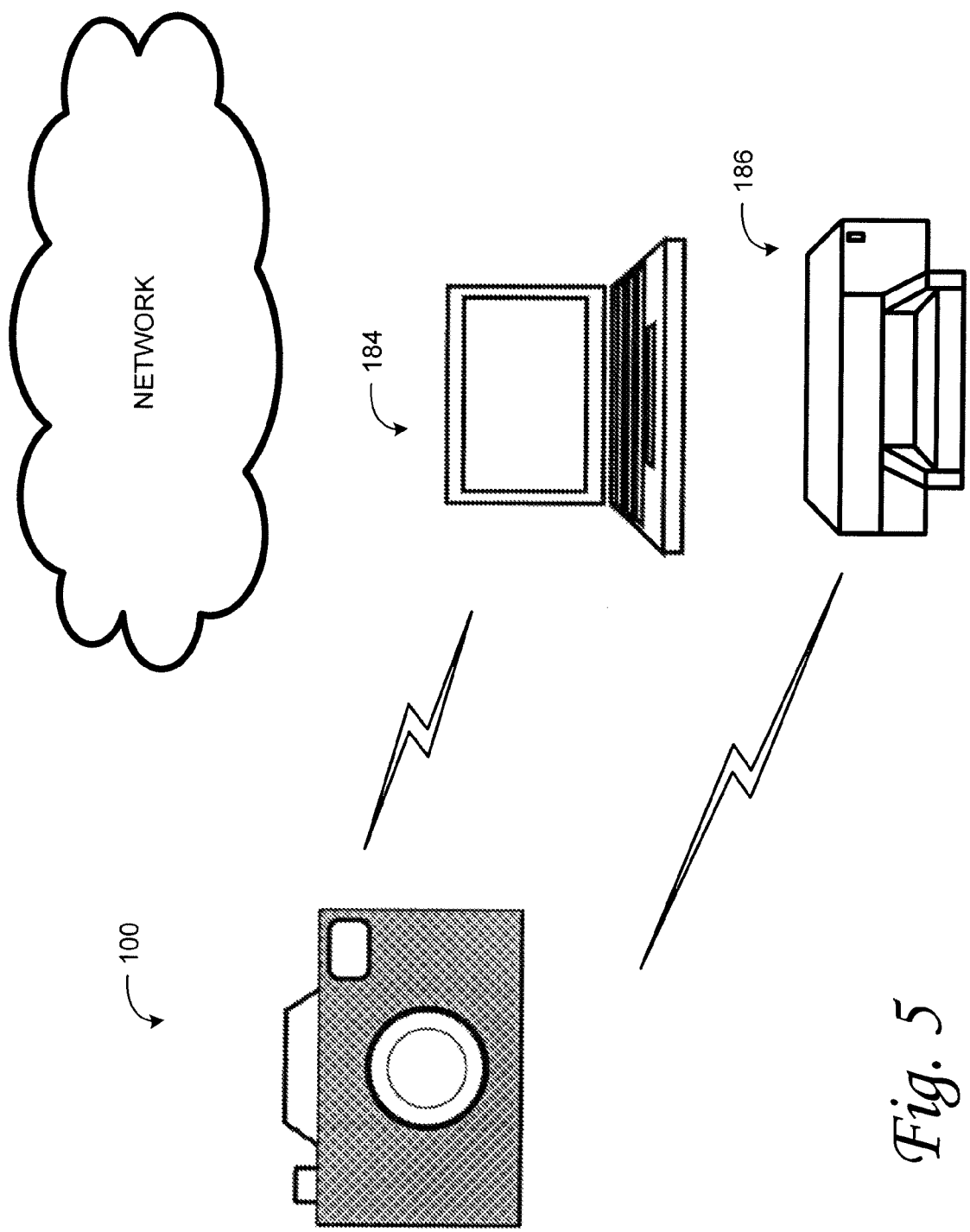
FIG. 5 is a diagram illustrating another example wherein the identified images can be transferred among other kinds of electronic devices including in accordance with one embodiment of the invention.

FIG. 5 is a diagram illustrating another example wherein the identified images can be transferred among other kinds of electronic devices including, for example, personal computers 184 and printers 186, in addition to digital cameras 100. Thus, for example, in such an embodiment a user may be provided the capability to identify a plurality of images based on feature content and to download those images from his or her camera or computer to a printer or otherwise share those images among one or more other devices. Also illustrated in FIG. 5 is a communication network over which images can be communicated. Although connections are not illustrated in FIG. 5 one with ordinary skill in the art will understand that various wired or wireless communication channels can be provided between an electronic device and a communication network to facilitate the transfer of images or other content thereon. In such embodiments, users can share identified images amongst other users in the network or otherwise transfer those images to other devices connected thereto. Thus, images can be transferred for storage, display, printing, sharing, or other functions as may be desired. Any of a variety of wireless networks can be utilized.

In another embodiment, a network to which devices interface can include the internet. As a further example in this embodiment, a user may identify images that he or she wishes to share and utilize the invention to e-mail those images to an identified user. Thus, for example, the electronic device can include an e-mail application in addition to the image identification and selection algorithms, or can appropriately invoke or link to an email application, to facilitate e-mailing identified images to one or more identified e-mail recipients.

In one embodiment, the invention can be implemented to, periodically or on request, scan one or more user directories for particular images, package those images in an email and send the e-mail to an identified recipient. As a further example of this, in one embodiment the invention can be packaged as an application configured to operate on a personal computer, computing device or other electronic device. In the application, the user can identify various features of interest as well as recipients of images containing one or more of those features. The invention can further be configured such that when the images are captured or downloaded to the computer, those images are automatically scanned, the identified features compared to an action list for those features and the appropriate action taken.

To illustrate by way of a more specific example, a family may wish to configure the system such that images containing pictures of their children are automatically e-mailed to the children's grandparents. As such, the invention can be configured to allow profiles to be stored enabling the parents to identify one or more faces of the children and to further identify e-mail addresses to which pictures of the children are to be sent. As such, on a periodic basis, upon the download or receipt of new images, or upon user initiation, appropriate directories can be scanned for images containing the identified features (in this example pictures of the grandchildren) and the action identified with those features (in this example e-mailing the pictures to the grandparents) can be initiated. Accordingly, the users can identify various action profiles including one or more features to be searched for and one or more actions to be taken when the identified features are located.

Figure 6:
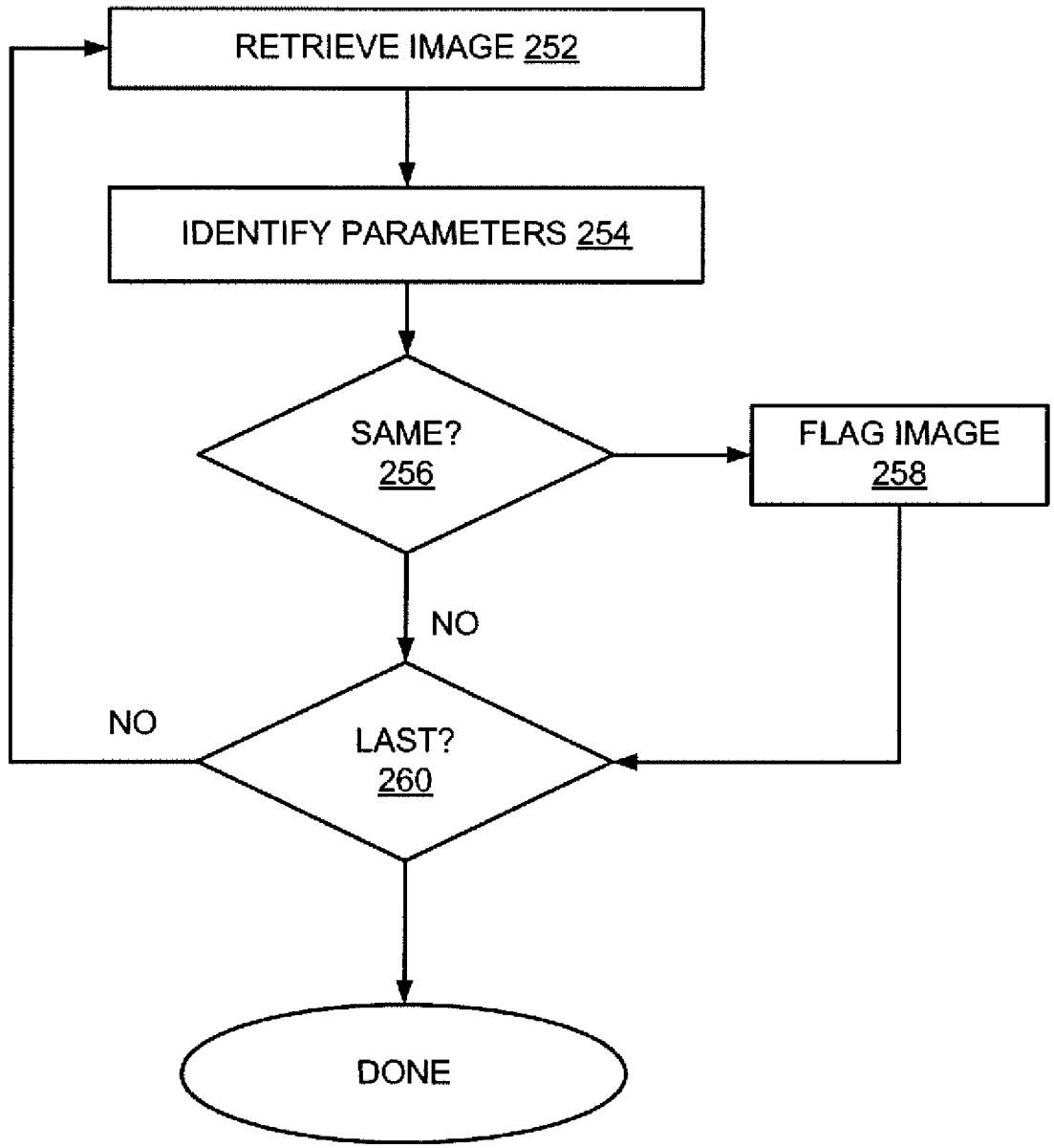
FIG. 6 is a diagram illustrating an example process for search for images containing identified parameters in accordance with one embodiment of the invention.

FIG. 6 is a diagram illustrating an example process for search for images containing identified parameters in accordance with one embodiment of the invention. As discussed above with respect to FIG. 2, in that example in Steps 152 and 154 the system was configured to search for and retrieve images that contained an identified set of parameters. In that example, images with faces of particular individuals were searched. Referring now to FIG. 6, an example of how such a search can be conducted is now described. In a Step 252, an image to be scanned is retrieved. For example, the system might be configured to search a particular directory or a plurality of directories for images containing the desired parameters. In this example, the images are retrieved and scanned one by one or in a pipelined process.

In a Step 254, the retrieved image is scanned to identify the appropriate parameters. For example, in terms of the facial recognition example described above with respect to FIG. 2, retrieved images can be scanned to determined whether it includes any faces and, if so, whether any of the faces contained therein match the face for which the user has requested a search. In a Step 256, if the parameters match, the image can be flagged or otherwise identified as a selected image. Images can be flagged for later operation as illustrated by Step 258. Alternatively, images can be copied for later operation or immediately copied, transferred or moved. As illustrated by Step 260, the operation can continue until the last of the images are scanned.

Figure 7:
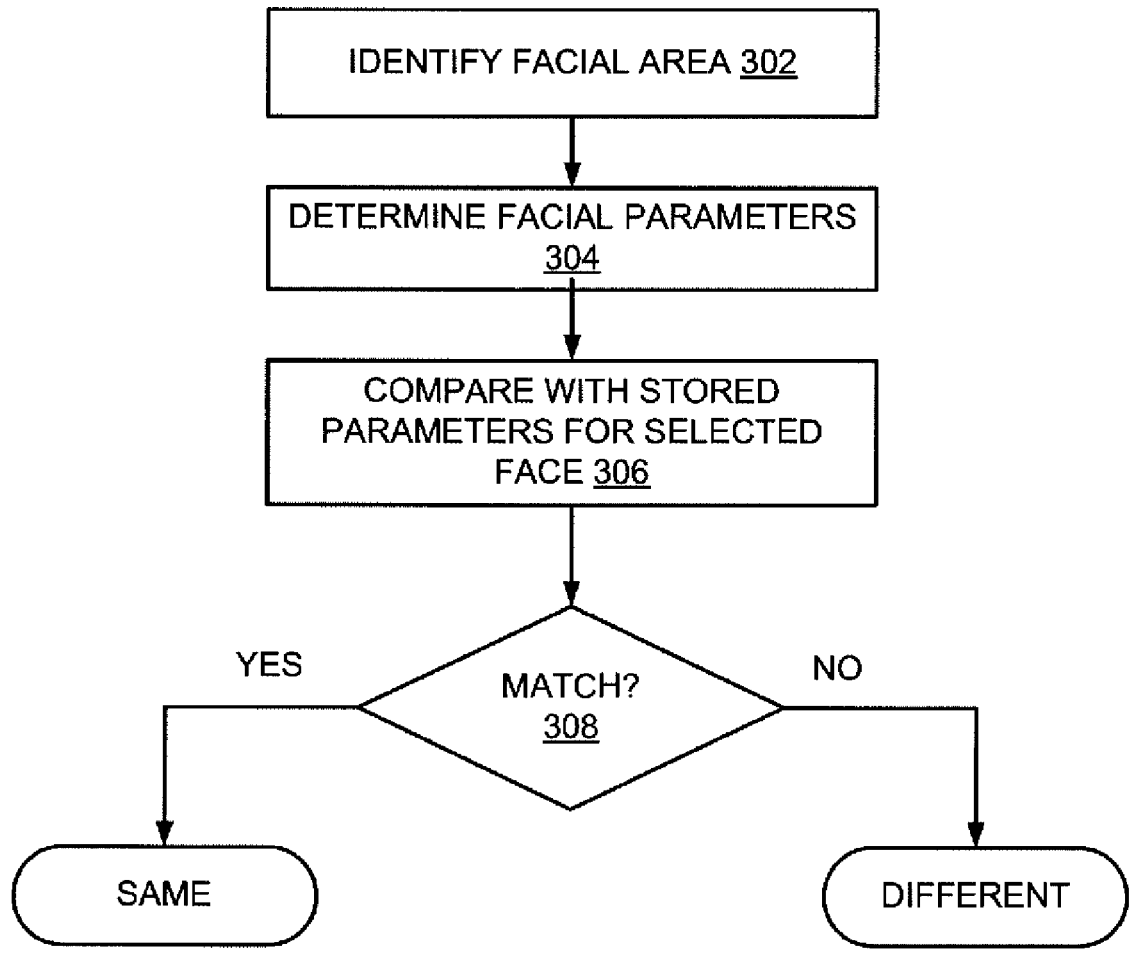
FIG. 7 is a diagram illustrating an example process for identifying images where the user is searching for photographs of individuals in accordance with one embodiment of the invention.

FIG. 7 is a diagram illustrating an example process for identifying images where the user is searching for photographs of individuals in accordance with one embodiment of the invention. Particularly, FIG. 7 illustrates an example process that can be implemented to accomplish Step 256 of FIG. 6 and describes this step in terms of a facial recognition example. Referring now to FIG. 7, in a Step 302, the system first identifies one or more facial areas that might be included in an identified content item. In a Step 304, for the facial items identified, the system determines facial parameters. For example, one or more face recognition algorithms can be implemented to determine a data set identifying the face. In a Step 306, this data set is compared with the stored parameter for the one or more selected faces. If there is a match (Step 308), the image can be flagged or otherwise identified for operation.

Figure 8:
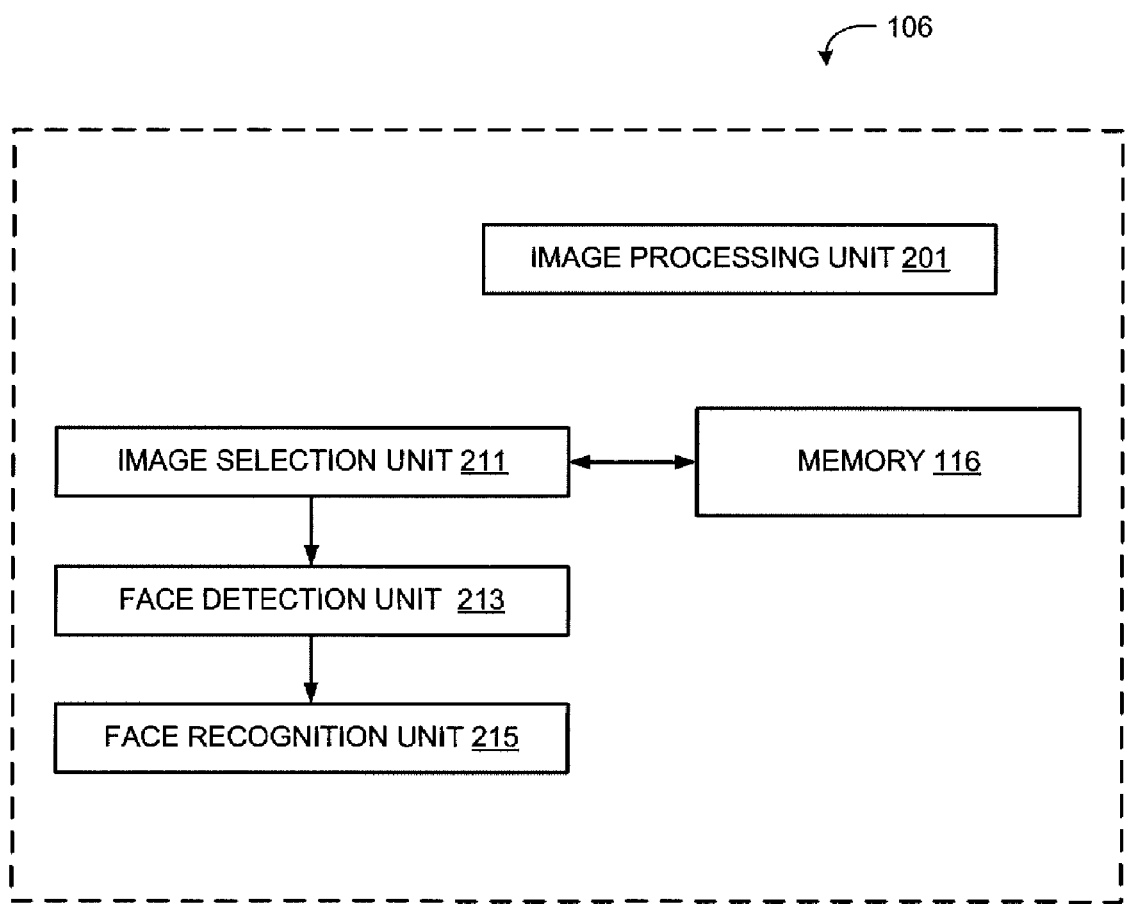
FIG. 8 is a diagram illustrating an example of logic that can be utilized in conjunction with the present invention in terms of an example implementation with an electronic capture device implemented as a digital camera.

In a preferred embodiment, control logic can be provided to perform the image selection and identification processes. For example, in one embodiment, one or more digital signal processors and associated logic and memory can be implemented to execute the appropriate algorithms, although other control logic can be utilized. FIG. 8 is a diagram illustrating an example of logic that can be utilized in conjunction with the present invention in terms of an example implementation with an electronic capture device implemented as a digital camera. Referring now to FIG. 8, the features and functionality associated with the invention are illustrated as being performed by image processor module 106. In the example of a digital camera, an image processor module 106 may be configured to perform typical imaging operations associated with operation of the digital camera. This can include, operations such as, image capture, image compression, image sharpening or refinement, white balance color processes, and so forth. In the illustrated example, the processes of image selection, feature detection and image identification are illustrated as being included with the same image processor 106. As would be apparent to one of ordinary skill in the art after reading this discussion, these features need not be integrated with image processor module 106 but in other embodiments can be included in separate modules or applications.

Referring still to FIG. 8, the illustrated example includes an image processing unit 201. In this example, image processing unit 201 is configured to perform the customary image processing functions associated with a digital camera. These can include, for example, the aforementioned functions of image processing, image compression, color processing, and so forth. The example architecture also includes an image selection unit 211 which can be configured to select one or more images matching the identified criteria. Image selection module 211 can be configured to call a face detection module 213 to detect faces that might appear in retrieved images. Once the faces are detected, a face recognition module 215 can scan the identified faces to determine whether they match the parameters. Upon receipt of a successful match, the image can be identified and stored in a data storage device. In the illustrated example, the data storage device is illustrated as memory device 116, associated with the image capture device 100. Although described in terms of facial recognition, it will be apparent to one of ordinary skill in the art how this and other embodiments described with respect to face recognition can be implemented to identify other features or parameters in addition to or in place of faces.

Figure 9A:
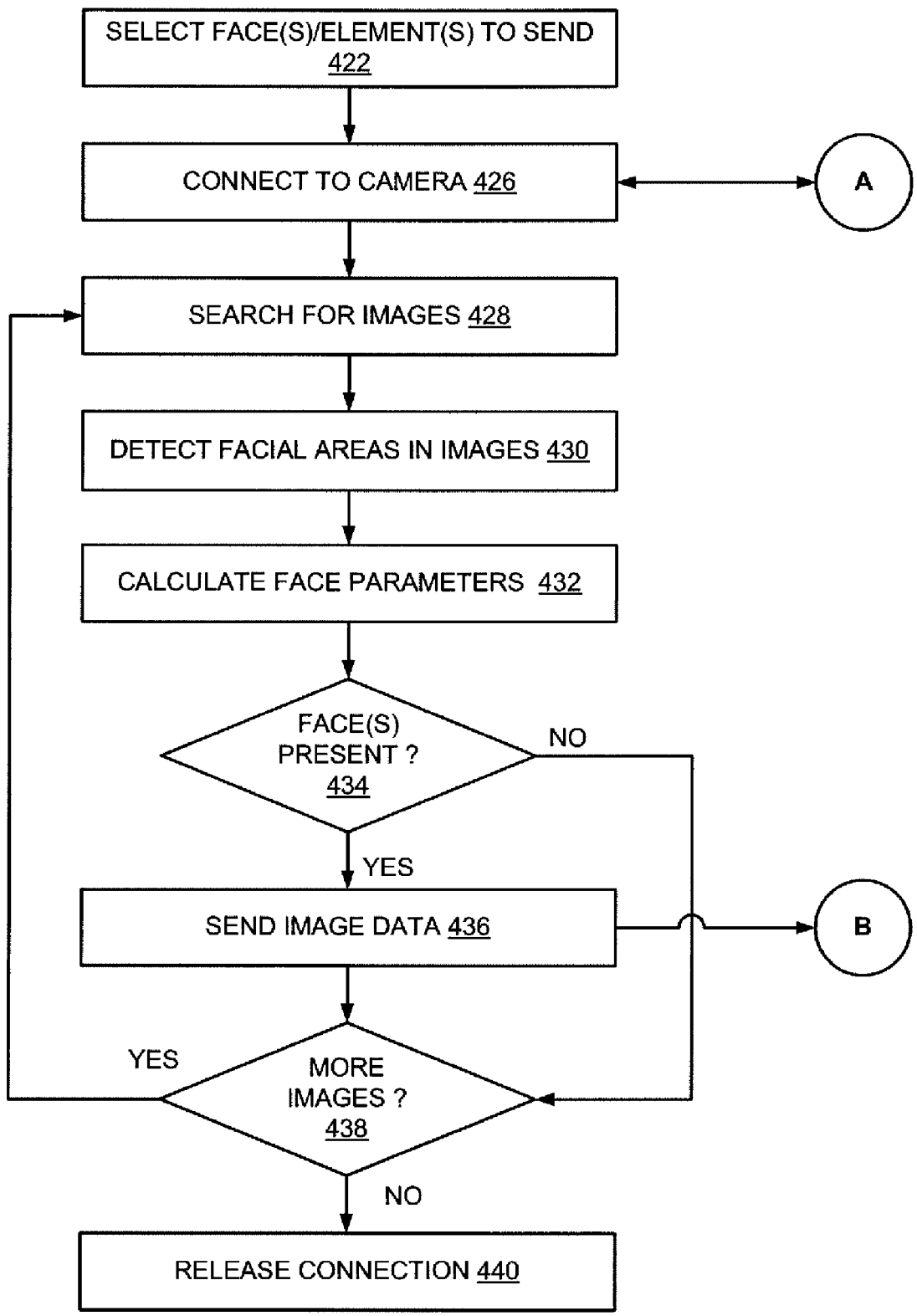
FIGS. 9a and 9b, is a diagram illustrating image selection and sharing in accordance with one embodiment of the invention.
Figure 9B:
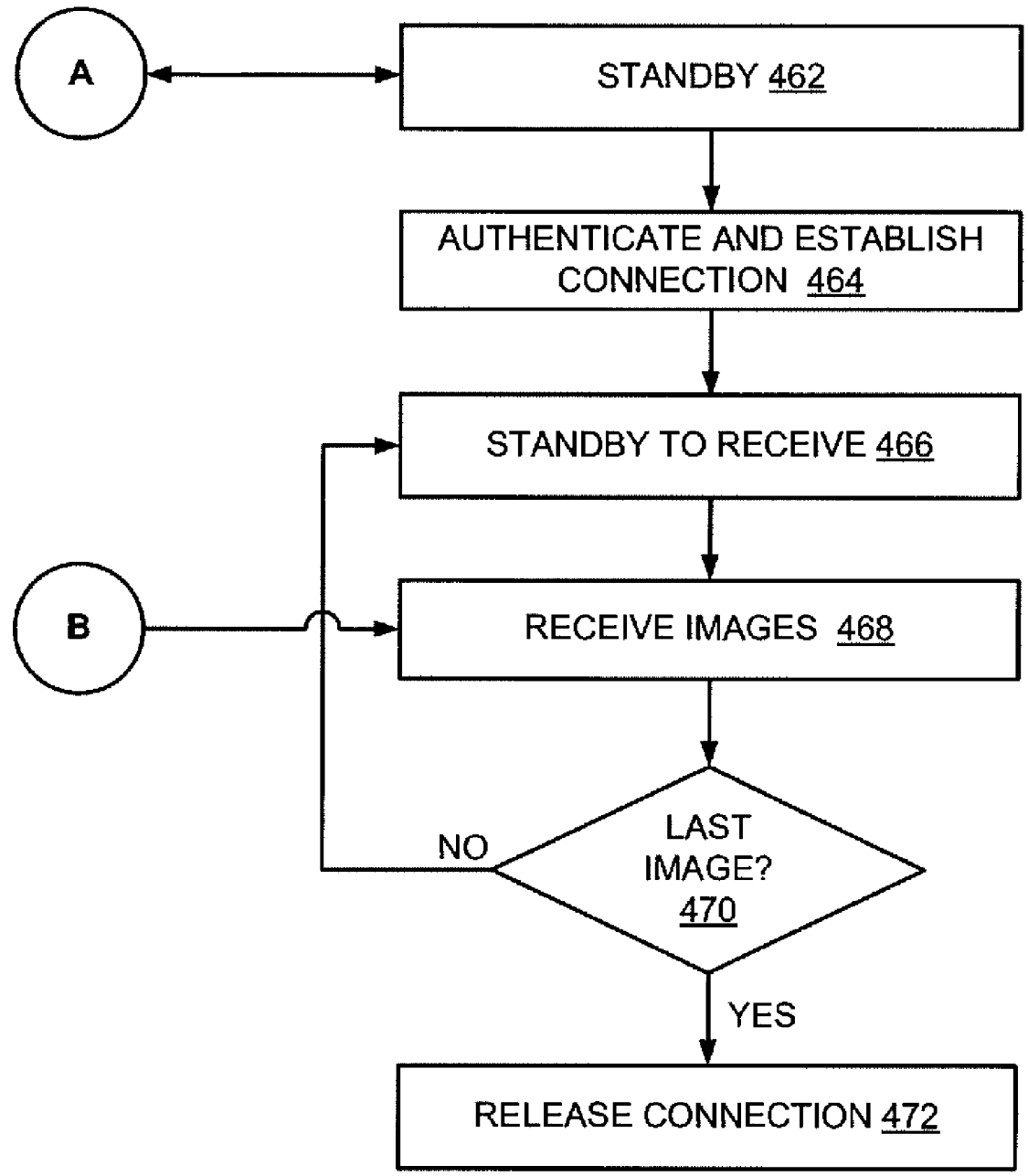

FIG. 9, which comprises FIGS. 9a and 9b, is a diagram illustrating image selection and sharing in accordance with one embodiment of the invention. The process illustrated in FIG. 9. The process described in the example of FIG. 9 is written in terms of the process wherein images are selected based on faces that may be contained in those images, and the selected images are transferred to another electronic device such as, for example, a digital camera. Referring now to FIG. 9, the operation commences with the selection of the images, the detection of facial areas, and selection of the faces to send as illustrated in Step 422. For example, in one embodiment, this can be accomplished in accordance with Steps 142 through 148 as described above with reference to FIG. 2.

In a Step 426, the electronic device (for example, a first digital camera) initiates communication with the receiving device. In the example illustrated in FIG. 9, the receiving device is a second digital camera 100. Meanwhile, in a Step 462, the second electronic device is powered on and ready to receive data via the communication interface. For example, the second camera can be placed in a listen or receive mode such that it can receive images to be transferred via a wireless or wireless communication link between the cameras. In response to the connection request in Step 426, the second camera can perform authentication or handshaking with the first camera to establish the connection between the two. This is illustrated in a Step 464. With the connection established, camera 2 can be placed in a mode to stand by and listen to the connection to be ready to receive transferred images as illustrated in Step 466.

With the connection established, the first camera can begin searching for images that contain the faces that the user wishes to send to the second camera. For example, this can be accomplished as described above with reference to Steps 150, 152 and 154 of FIG. 2. More particularly, in one embodiment this can be accomplished as discussed above with reference to FIG. 6. As illustrated in FIG. 9a, in a Step 428 the loop is initiated whereby the camera begins searching the plurality of images in an identified directory or other storage space as illustrated in Step 428. In Steps 430, 432 and 434 the process detects all facial areas in a retrieved image, performs the facial recognition algorithms to determine whether a face matches the selected face, and if so identifies the image for transfer. For each image identified for transfer, the image is sent to camera 2 as illustrated by Steps 436 in FIGS. 9a and 468 in FIG. 9b. Images can be transferred as they are identified as FIG. 9 illustrated, or they can be accumulated and transferred in a batch mode.

In accordance with Step 438, the process continues until the desired images are scanned and sent at which time the connection can be released at Step 440 and the search process can end.

When the second camera determines that it has received the last image, it can release the connection as illustrated by Steps 470 and 472. In one embodiment, this can be accomplished utilizing a time out period or other unilateral approach. In another embodiment, camera 1 can be configured to send a message to camera 2 indicating that the last image has been transferred. For example, a flag can be set indicating when the last image is sent. Accordingly, in one embodiment an identified image is not sent until subsequent images in the directory are scanned to determine whether there is another image to send. In this manner, the last image can be identified and so flagged.

Figure 10:
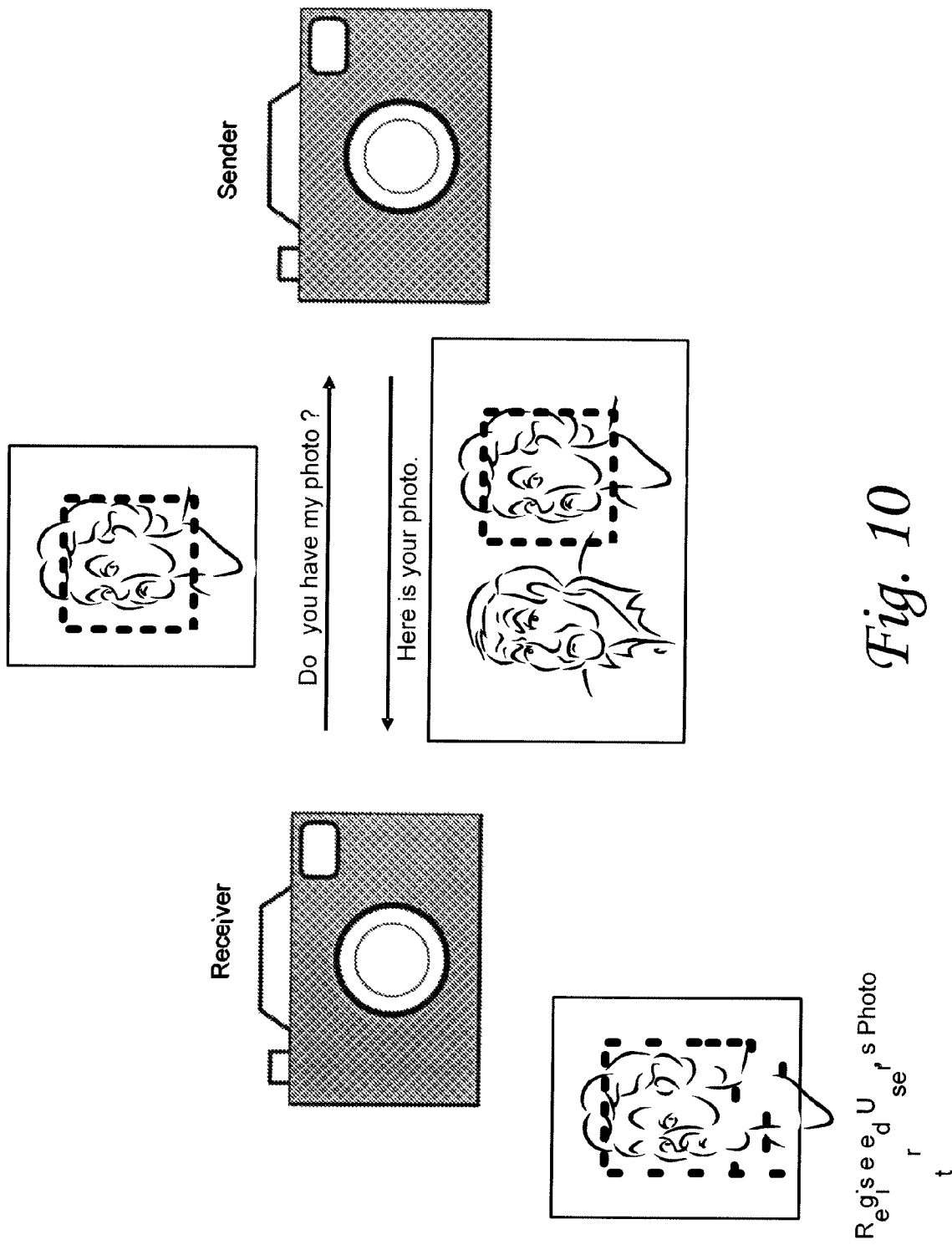
FIG. 10 is a diagram illustrating an example of performing a photo operation in accordance with one embodiment of the invention.

In yet another embodiment of the invention, an image, identified feature or data set for a processed feature might be sent from a first device to a second device to initiate an image search and image operations on the second device. For example, a user can request initiation of a file operation by providing his or her own picture to an electronic device. A user might provide a picture of himself to an electronic device and request that the electronic device transfer those pictures to his device or print those pictures or otherwise perform a picture operation. FIG. 10 is a diagram illustrating an example of performing a photo operation based on this sort of photo initiation in accordance with one embodiment of the invention. Referring now to FIG. 10, in this example a user wishes to receive photos of herself from her friend's camera. To accomplish this in accordance with this embodiment of the invention, this user sends her photo via a communication link to her friend's camera. In the illustrated example, the user's photo 500 is sent from her camera 100a to her friend's camera 100b, in response, camera 100b scans images in its memory to identify images that may have the same face as contained in photo 500. Such photos can be then retrieved (for example, in accordance with the various embodiments described above) and returned to the first camera.

For example, photo 502 is illustrated as an example of a photo retrieved from memory of camera 100b and returned to camera 100a in response to the first user's request. As with the other embodiments described herein, this embodiment is not limited to any particular electronic device and can be implemented utilizing other electronic devices in addition to or other than digital cameras 100. Likewise, it is not limited to an embodiment where a file transfer is requested nor is it limited to an embodiment wherein the feature searched and identified is a user's face. Indeed, in other embodiments of the invention, a user can identify a feature on one electronic device and forward an image containing that feature to another electronic device to identify an operation such as file transfer, file storage, file printing and other operations.

In one embodiment, users can save their photos or other identifying information such that they can make repeated requests to other devices without the need to re-identify the features to be searched. Thus, for example, a photo or a data set identifying the specified parameter can be saved and reused for various search operations. Thus, in one embodiment, the user can identify an image that he or she wishes to save for regular use in identifying transfers or other file operations and save this image to an image save area. A user can do this for a plurality of images and features and the system can be configured such that these images can be called up and selected by the user to identify images to be requested. Thus, for example, Steps 142 through 150 as illustrated in FIG. 2 can be performed in advance and the identified feature or even the calculated data set (Step 150) can be saved for reuse. This data set can be used within the instant electronic device or it can be sent to other electronic devices for use and identifying operations.

Figure 11:
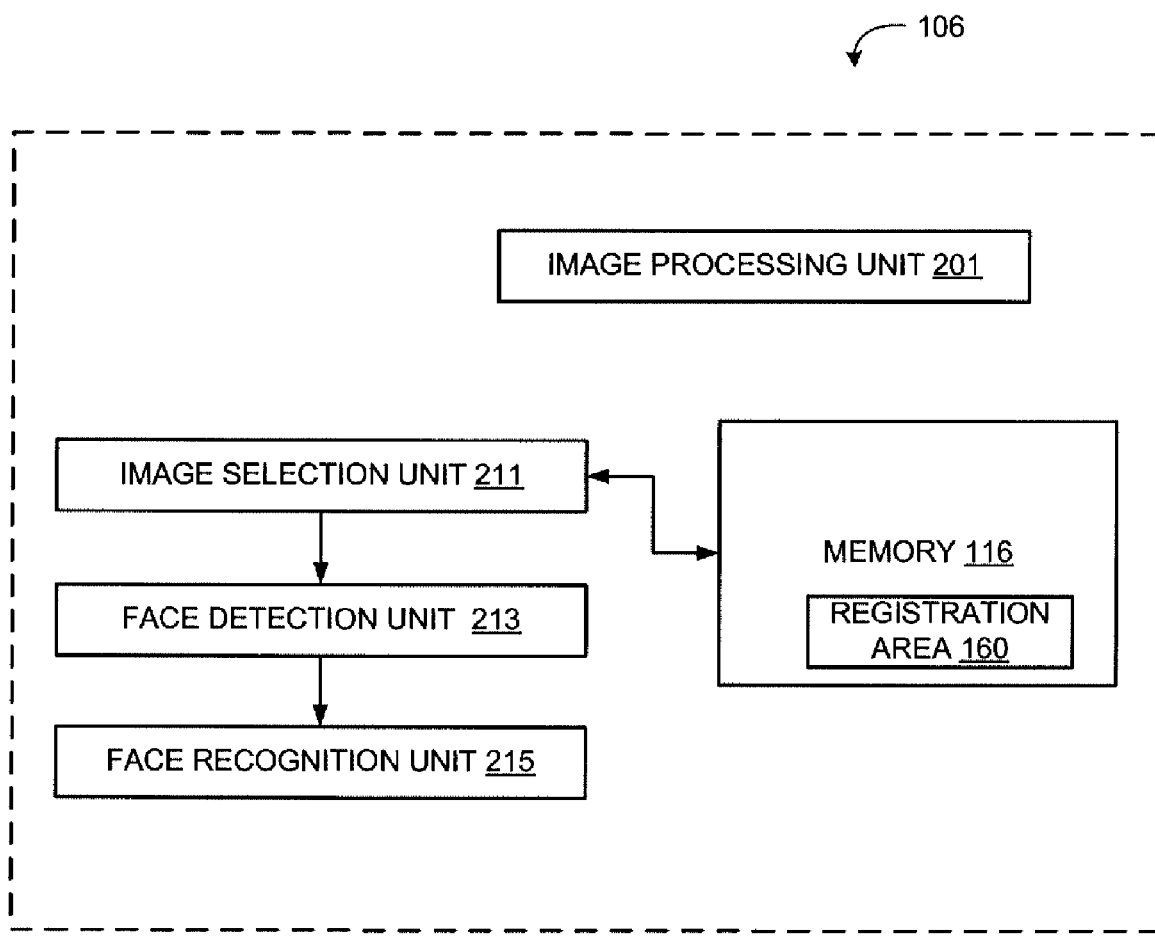
FIG. 11 is a diagram illustrating an example architecture in accordance with one embodiment of the invention.

As noted, in one embodiment, the user can store multiple images or data sets for recall. As one example, a user may wish to store data sets associated with her face and her best friends' faces such that she can routinely request pictures from other cameras that contain pictures of herself or her best friends, or search his or her own electronic devices for new images matching those criteria. As another example, a user may wish to store a picture of a person's face in various configurations such as, for example, a normal face, the face with eye-glasses, the face with sun-glasses, the face with a hat and so on. In this manner, searching of a person's face in various configurations can be coordinated and identified. In one embodiment, a separate storage area can be identified for saving one or more images that a user may wish to reuse in embodiments such as this. FIG. 11 is a diagram illustrating an example architecture similar to that illustrated in FIG. 8 but further including a separate storage area 160 for storing images or data parameters so that a user does not need to reselect images and features when requesting image operations.

Figure 12A:
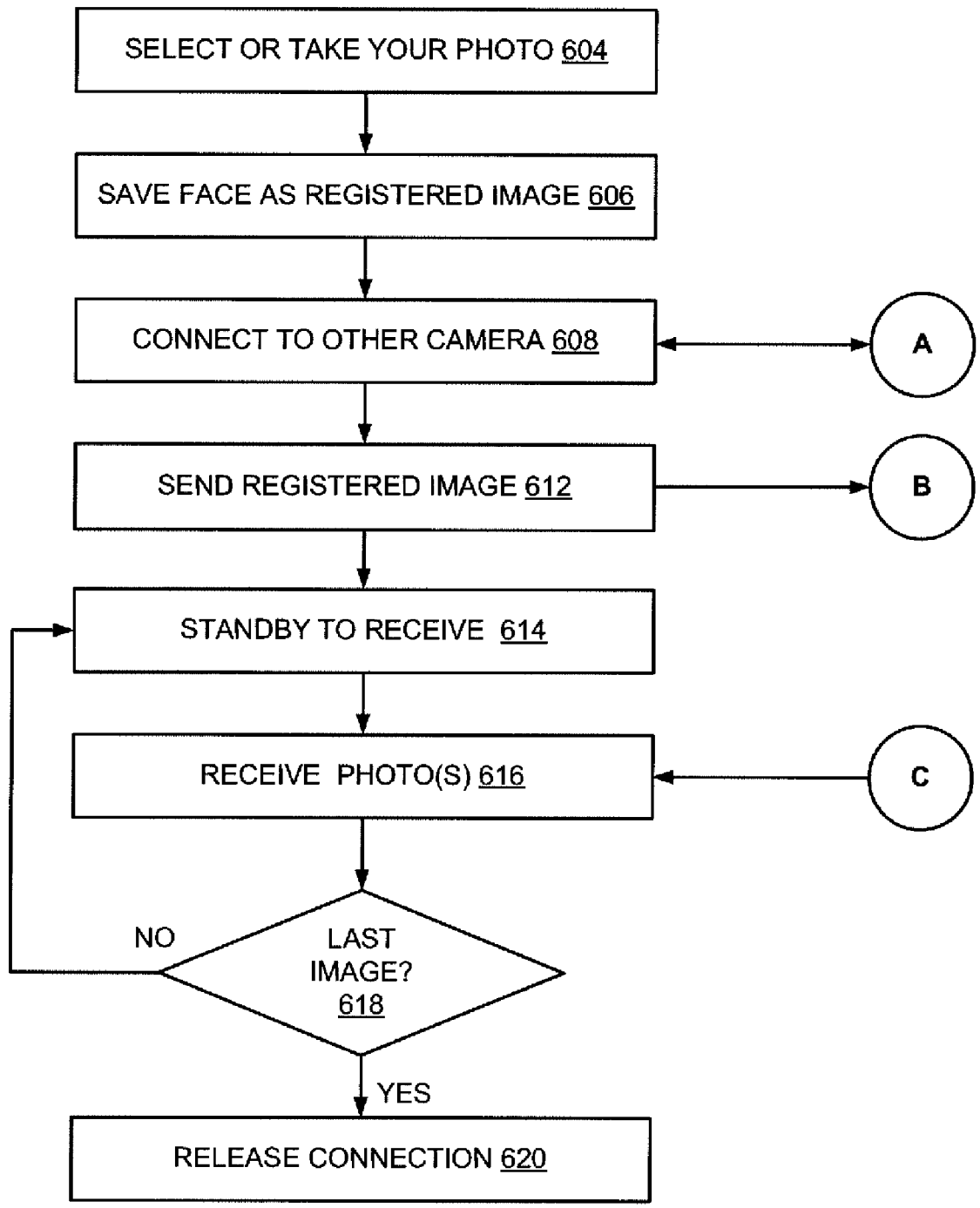
FIGS. 12a and 12b, is a diagram illustrating an example process for requesting image operations by sending a user's own image data in accordance with one embodiment of the invention.
Figure 12B:
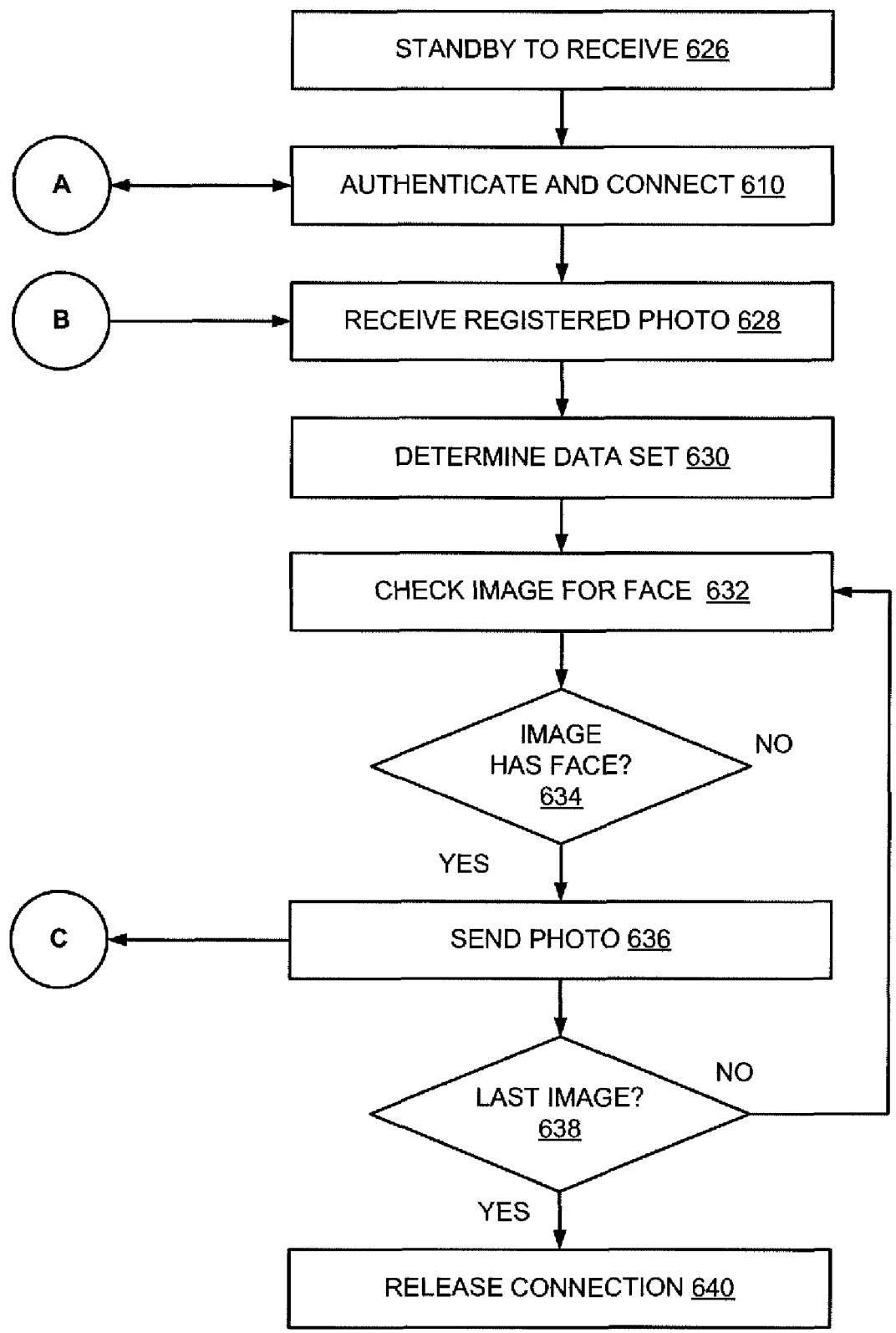

FIG. 12 which comprises FIGS. 12a and 12b is a diagram illustrating an example process for requesting image operations by sending a user's own image data in accordance with one embodiment of the invention. Referring now to FIG. 12, the illustrated example is described in terms of a user taking a picture of herself, saving that image or the parameters associated therewith so that subsequent requests for pictures of herself can be made, and sending such requests to another device as with the other embodiments illustrated and described herein.

In a Step 604 a user identifies a picture of herself that she would like to identify search criteria to subsequently search for additional pictures. For example, as discussed above with respect to FIG. 2 at Steps 142 through 150, the user can select an image and one or more faces in the image can be highlighted by the system. The user can select the face (in this example, her face) and this face can be saved. In one embodiment, the image and identification of the face can be saved for subsequent reuse. In another embodiment, one or more algorithms can be utilized to perform facial recognition and the data set obtained therefrom can be stored for future use. The entire image or a portion of the image associated therewith that was used to create the data set can also be stored along with the data set such that it can be referenced easily by the user for example by displaying the image on a screen. In one embodiment, the image can be saved as a thumbnail or other like reduced size image to facilitate quick display and to minimize the amount of storage required. Thus, as illustrated by Step 606 the image or the data set are stored such that they can be recalled by the user for subsequent operation requests. In Steps 608 and 610, a connection between the two devices is established. In one embodiment, this can be accomplished as described above with reference to Steps 426 and 464 in FIG. 9. Likewise, as discussed above with respect to FIG. 9 at Step 462, in a Step 626, the second device can be in a standby mode with its communication interface active, ready to receive data.

When the user selects the data set that she wishes to send, this data set can be sent from the first device to the second device as illustrated by Steps 612 and 628. In one embodiment, as described above, the image itself can be sent from the first device to the second device such that the second device can perform the facial recognition and search for images that may be accessible by the second device. In another embodiment, the data set might be sent from the first device to the second device such that the data set can be used to match two images accessible by the second device for image transfer. One advantage of sending the image as opposed to or in addition to the data set could be that it could allow the second device to use a facial recognition algorithm that is different from that used by the first device. As such, the devices do not need to be synchronized in terms of the facial recognition (or other feature recognition) algorithms that they use.

In a Step 614, the first device goes into a standby mode where it continues to monitor the communication interface and awaits receipt of images from the second device. Meanwhile, the second device determines the data set for the requested face in Step 630 and scans images in its memory to identify images that contain the same data set as requested in Steps 632 and 634. In an example where a data set is sent to the second device, images can be retrieved by the second device based on the data set and returned to the first device. In embodiments where an image is sent, the second device can calculate the face parameters of the image that it received from the first device, search images in its own data storage areas to determine whether they have faces that meet the same facial parameters. In a Step 636, requested images are returned. As illustrated at step 638, this process can be repeated for a plurality of images. In one embodiment, the process can be performed as described above with reference to FIG. 9 at Steps 428 to 438.

As noted above, images retrieved can be sent from the second device to the first device as illustrated in Steps 636 and 616 and the transfer can continue for a plurality of images as illustrated by Steps 618 and 638. The images transferred can be flagged or otherwise identified such that the last transferred image can be noted so that the connection can be released as illustrated by Steps 620 and 640. Additionally, a time-out period can be used to sever the connection absent receipt of a last image flag.

Although the embodiment described above with reference to FIGS. 10 through 12 was described in terms of transferring images between two devices, one of ordinary skill in the art after reading this discussion will understand that this can be referenced to various image operations among a plurality of electronic devices. For example, a user may send a registered photo or data set to a plurality of other devices including printers, computers, digital photo albums and the like and request an operation be performed on images stored therein or accessible thereby matching the registered photo or parameters. For example, a user may wish to trigger the e-mailing of a plurality of pictures from his or her home computer to one or more e-mail recipients and in accordance with one embodiment do so by sending a registered photo or data set from his device to the computer whereby the computer searches its data areas for matching photos to send. As another example, a user may wish to select a set of photographs to be displayed in a digital photo album based on a registered photo or data set sent by one device to the photo album. As a further example, the photo album might have a plurality of pictures stored therein pertaining to a variety of different subjects or containing a variety of different subject matter. A user may, for example, wish to display photos of his or her new born baby on the photo album when grandma and grandpa come to visit. By sending a registered or previously identified or stored picture or data set to the photo album, the photo album can conduct the search and display pictures of the baby.

Where the data base and the photo album are static virtual or physical directories can be established such that the searching does not have to be conducted each time a new request is initiated. However, where the data base may be updated with new photos such an embodiment might be useful to allow requests to be received by the photo album (or other device) and the search conducted and the results returned regardless of when the last update to the data base has been made.

As described above, thumbnails or other images can be stored to facilitate access of registered images or data sets by a user. To further illustrate this example, a digital photo album may have a menu page that displays the plurality of thumbnails or other images that the user can select. Thus, in the example of face recognition, a plurality of faces may be displayed on the menu screen enabling the user to select one or more of the faces it wishes to see pictures of. Upon receipt, the photo album can search the directory for images that may have been previously flagged as being associated with that thumbnail and can also perform facial recognition on new images that have been placed into the data base. A slide show can be created matching the selection of criteria and the images presented to the user on the digital photo album. A flagged data set can be updated to note the images that belong to the data set if the data set has changed. Storage dates of images entered into the data base as well as dates of the last search based on a registered data set can be maintained such that the photo album can determine whether to conduct a new search for identified pictures or whether it can rely on previously searched and stored data.

The various embodiments described above at times reference particular scenarios with particular devices. As will be apparent to one of ordinary skill in the art after reading this description, the invention can be implemented in different scenarios with different devices. For example, the scenarios above describe feature recognition in terms of facial recognition and describe various embodiments using digital cameras, electronic photo albums, computers and the like. As these examples serve to illustrate, these embodiments can be implemented with a number of different parameters and a number of different electronic devices to facilitate utilization of the invention and its various features.

Figure 13:
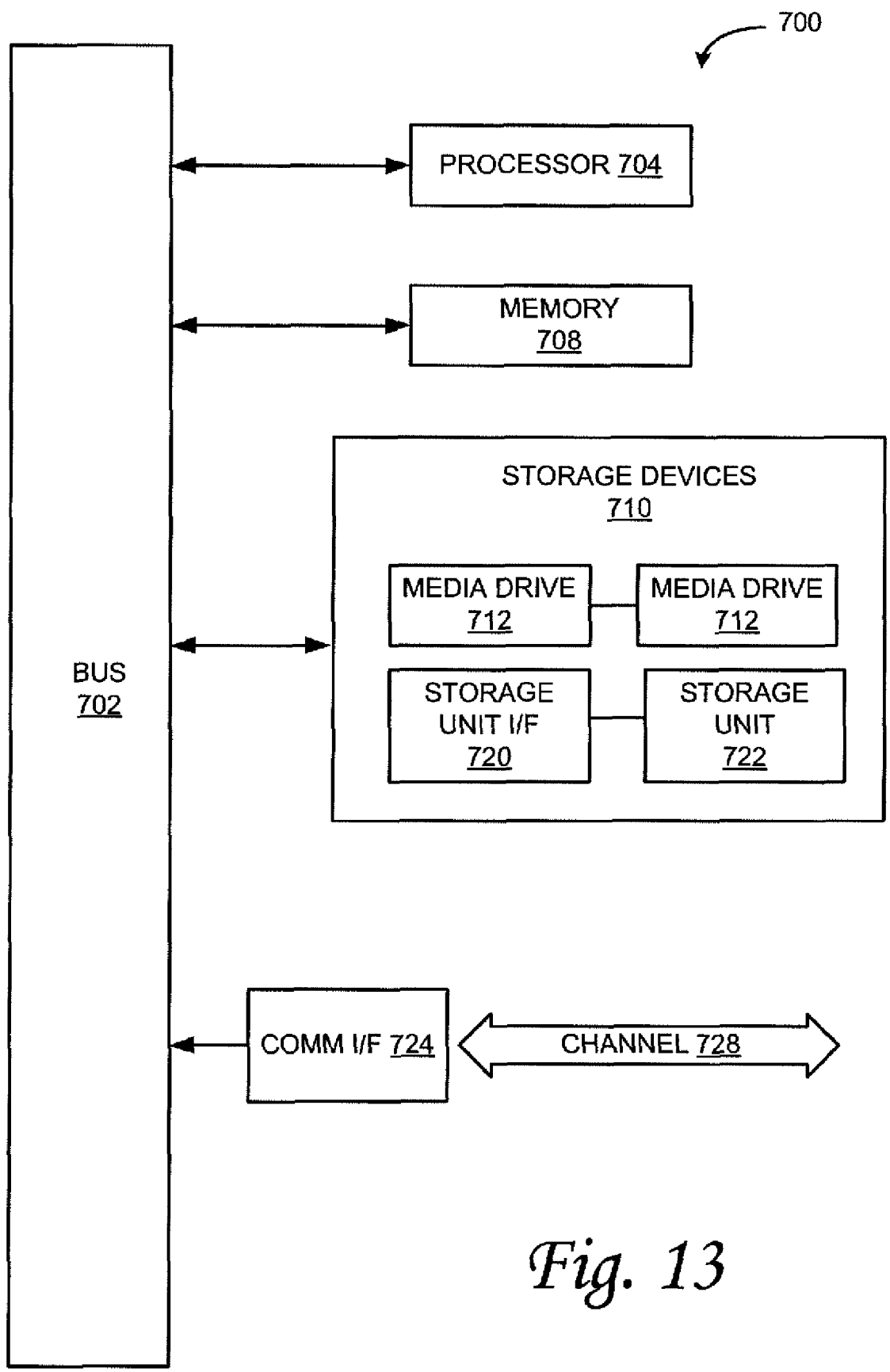
FIG. 13 is a diagram illustrating an example computing module in accordance with one embodiment of the invention.

As used herein, the term module is used to describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 13. Various embodiments are described in terms of this example computing module 700. After reading this description, it will become apparent to a person skilled in the relevant art how to implement the invention using other computing modules or architectures.

Referring now to FIG. 13, computing module 700 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special or general purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, modems, routers, WAPs, and any other electronic device that might include some form or processing capabilities.

Computing module 700 might include one or more processors or processing devices, such as a processor 704. Processor 704 might be implemented using a general-purpose or special-purpose processing engine such as, for example, a microprocessor, controller, or other control logic. In the example illustrated in FIG. 7, processor 704 is connected to a bus 702 or other communication medium to facilitate interaction with other components of computing module 700.

Computing module 700 might also include one or more memory modules, referred to as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive. Accordingly, storage media 714, might include, for example, a hard disk, a floppy disk, magnetic tape, optical disk, a CD or DVD, or other fixed or removable medium that is read by, written to or accessed by media drive 712. As these examples illustrate, the storage media 714 can include a computer usable storage medium having stored therein particular computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, 802.XX or other interface), a communications port (such as for example, a USB port, IR port, RS232 port Bluetooth interface, or other port), or other communications interface. Software and data transferred via communications interface 724 might typically be carried on signals, which can be electronic, electromagnetic, optical or other signals capable of being exchanged by a given communications interface 724. These signals might be provided to communications interface 724 via a channel 728. This channel 728 might carry signals and might be implemented using a wired or wireless medium. Some examples of a channel might include a phone line, a cellular phone link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and signals on channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A digital camera, comprising:
   a body;
   an image sensor in the body;
   a communications interface in the body, the communications interface configured to establish a communication link with another digital camera;
   an image processor configured to receive, from the communications interface, a first data set of parameters associated with a face highlighted in a first facial area in a first image and to provide an image to the communications interface;
   wherein the first data set of parameters is generated by a predetermined facial recognition process; and
   executable program code embodied in a computer readable medium and configured to cause the image processor to:
      receive the first data set of parameters associated with the first facial area from the other digital camera via the communications interface;
      scan one or more subsequent images stored in memory accessible by the image processor;
      identify facial areas in the subsequent images and, using the predetermined facial recognition process, process image data associated with identified facial areas in the subsequent images to determine subsequent data sets of parameters associated with identified facial areas;
      compare the first and subsequent data sets to determine whether the one or more subsequent images includes a same face as the face highlighted in the first image;
      accumulate a set of the subsequent images that include the same face as the face highlighted in the first image; and
      provide images from the set of the subsequent images that include the same face to the communications interface for transmission to the other digital camera.

2. The digital camera of claim 1, wherein the executable program code, further comprises second code configured to cause the image processor determine the image data associated with a first facial area in a first image, the second code comprising code that, when executed by the image processor, further causes the image processor to: scan a first image; identify one or more faces in the scanned first image; display the first image to a user with one or more facial areas associated with the identified one or more faces highlighted; and to accept from the user a selection of a facial area.

3. The camera of claim 1, wherein executable program code is further configured to receive a predetermined data set of parameters associated with a facial area from another electronic device and the comparison comprises comparing the predetermined and subsequent data sets to determine whether the one or more subsequent images includes a same face as a face in an external image from which the predetermined data set was obtained.

4. The digital camera of claim 1, wherein the communication interface comprises an ultra wideband, WiFi, Bluetooth, 802.xx or other wireless communication interface.

5. The digital camera of claim 1, further comprising a memory configured to store image data associated with a predetermined facial area.

6. The digital camera 1, wherein the first facial area is selected by a user.

7. The digital camera of claim 1, wherein the executable program code is further configured to cause the image processor to receive the first image with the first data set of parameters.

8. The digital camera of claim 1, wherein the executable program code is further configured to cause the image processor to receive the first facial area with the first data set of parameters.

9. A digital camera, comprising:
   a body;
   an image sensor in the body;
   a communications interface in the body, the communications interface configured to establish a communication link with another digital camera;
   an image processor configured to generate a first data set of data parameters associated with a face highlighted in a first facial area in a first image and to provide the first data set of data parameters to the other digital camera;
   wherein the first data set of parameters is generated by a predetermined facial recognition process; and
   executable program code embodied in a computer readable medium and configured to cause the image processor to:
      receive a second image from the other digital camera;
      wherein the second image is selected by the other digital camera by performing the predetermined facial recognition process on the second image and comparing a resultant data set to the first data set of data parameters provided to the other digital camera.

10. The digital camera 9, wherein the digital camera is configured to store the first data in memory for future image transfer operations.

11. The method of claim 9, wherein the image processor is further configured to provide the first image to the other digital camera with the first data set of parameters.

12. The method of claim 9, wherein the image processor is further configured to provide the first facial area to the other digital camera with the first data set of parameters.

13. A method performed by a digital camera, comprising:
   receiving a first data set of parameters from another digital camera, wherein the first data set of parameters is generated by a predetermined facial recognition process and associated with a face highlighted in a first facial area in a first image;
   scanning one or more subsequent images stored in memory in the digital camera;
   identifying facial areas in the subsequent images and, using the predetermined facial recognition process, processing image data associated with identified facial areas in the subsequent images to determine subsequent data sets of parameters associated with identified facial areas;
   comparing the first and subsequent data sets to determine whether the one or more subsequent images includes a same face as the face highlighted in the first image;
   accumulating a set of the subsequent images that include the same face as the face highlighted in the first image; and
   providing images from the set of the subsequent images that include the same face for transmission to the other digital camera.

14. The method of claim 13, wherein the first facial area is selected by a user.

15. The method of claim 13, further receiving the first image with the first data set of parameters.

16. The method of claim 13, further receiving the first facial area with the first data set of parameters.

17. A method performed by a digital camera, comprising:
generating a first data set of data parameters associated with a face highlighted in a first facial area in a first image;
providing the first data set of data parameters to another digital camera;
wherein the first data set of parameters is generated by a predetermined facial recognition process; and
receiving a second image from the other digital camera;
wherein the second image is selected by the other digital camera by performing the predetermined facial recognition process on the second image and comparing a resultant data set to the first data set of data parameters provided to the other digital camera.

18. The method of claim 17, wherein the first facial area is selected by a user.

19. The method of claim 17, further providing the first image to the other digital camera with the first data set of parameters.

20. The method of claim 17, further providing the first facial area to the other digital camera with the first data set of parameters.

* * * * *